US012222969B2

(12) United States Patent
Hattori

(10) Patent No.: US 12,222,969 B2
(45) Date of Patent: Feb. 11, 2025

(54) MANAGEMENT DEVICE, DATABASE SYSTEM, MANAGEMENT METHOD, AND COMPUTER PROGRAM PRODUCT

(71) Applicants: KABUSHIKI KAISHA TOSHIBA, Tokyo (JP); TOSHIBA DIGITAL SOLUTIONS CORPORATION, Kawasaki (JP)

(72) Inventor: Masakazu Hattori, Yokohama Kanagawa (JP)

(73) Assignees: KABUSHIKI KAISHA TOSHIBA, Tokyo (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 18/459,472

(22) Filed: Sep. 1, 2023

(65) Prior Publication Data

US 2023/0409608 A1 Dec. 21, 2023

Related U.S. Application Data

(63) Continuation of application No. PCT/JP2021/016480, filed on Apr. 23, 2021.

(51) Int. Cl.
*G06F 16/22* (2019.01)
*G06F 11/14* (2006.01)
(Continued)

(52) U.S. Cl.
CPC ........ *G06F 16/285* (2019.01); *G06F 11/1469* (2013.01); *G06F 16/2282* (2019.01); *G06F 16/23* (2019.01); *G06F 2201/80* (2013.01)

(58) Field of Classification Search
CPC ............... G06F 16/285; G06F 11/1469; G06F 16/2282; G06F 16/23; G06F 2201/80; G06F 16/25
See application file for complete search history.

(56) References Cited

U.S. PATENT DOCUMENTS 5,724,581 A * 3/1998 Kozakura ........... G06F 11/1448
714/E11.13
6,374,264 B1 * 4/2002 Bohannon ........... G06F 11/1474
714/13
(Continued)

FOREIGN PATENT DOCUMENTS

JP 06-214848 8/1994
JP 2006-139696 6/2006
(Continued)

OTHER PUBLICATIONS

International Search Report and Written Opinion for International Application Serial No. PCT/JP2021/016480 mailed on Jul. 13, 2021, 9 pages.

(Continued)

*Primary Examiner* — Merilyn P Nguyen
(74) *Attorney, Agent, or Firm* — Amin, Turocy & Watson, LLP

(57) ABSTRACT

A page-table size is reduced. A management device manages a data group by dividing the data group into pages. The management device includes a page-processing unit and a data-log-management unit. When update processing is first executed on an update target page in the current-generation, the page-processing unit secures a free space and updates the update target page on the secured free space. The page-processing unit adds, to a data log file of the current-generation, a CPUNDO log indicating a correspondence between a logical address and a physical address in the update target page. The data-log-management unit writes data at starting of the current-generation to a data storage device for the immediately previous operation page. The data-log-management unit adds, to the data log file of the current-generation, a CPREDO log indicating a correspon-
(Continued)

dence between the logical address and the physical address in the immediately previous operation page.

14 Claims, 24 Drawing Sheets

(51) Int. Cl.
*G06F 16/23* (2019.01)
*G06F 16/28* (2019.01)

(56) References Cited

U.S. PATENT DOCUMENTS

| | | | |
|---|---|---|---|
| 7,031,984 B2 | 4/2006 | Kawamura et al. | |
| 7,440,966 B2 | 10/2008 | Adkins et al. | |
| 7,631,018 B2 | 12/2009 | Lee et al. | |
| 8,161,006 B2 | 4/2012 | Kawamura | |
| 10,228,875 B2* | 3/2019 | Lu | G06F 3/061 |
| 10,969,970 B2 | 4/2021 | Hattori | |
| 2006/0069885 A1 | 3/2006 | Matsui et al. | |
| 2009/0150641 A1* | 6/2009 | Flynn | G06F 12/1081 |
| | | | 711/202 |
| 2009/0248964 A1* | 10/2009 | Yano | G06F 3/061 |
| | | | 711/E12.001 |
| 2010/0138391 A1 | 6/2010 | Namikawa et al. | |
| 2018/0150498 A1 | 5/2018 | Shimizu | |
| 2019/0073277 A1* | 3/2019 | Meng | G06F 11/1474 |
| 2019/0102262 A1* | 4/2019 | Sukhomlinov | G06F 11/1469 |
| 2020/0175008 A1 | 6/2020 | Bensberg et al. | |
| 2020/0364042 A1 | 11/2020 | Wuensche | |
| 2024/0004569 A1* | 1/2024 | Shveidel | G06F 3/0659 |

FOREIGN PATENT DOCUMENTS

| | | |
|---|---|---|
| JP | 4104586 | 6/2008 |
| JP | 4256851 | 4/2009 |
| JP | 2009-217688 | 9/2009 |
| JP | 4393762 | 1/2010 |
| JP | 2010-134522 | 6/2010 |
| JP | 4589427 | 12/2010 |
| JP | 4594928 | 12/2010 |
| JP | 2012-247901 | 12/2012 |
| JP | 5719083 | 5/2015 |
| JP | 2018-85042 | 5/2018 |

OTHER PUBLICATIONS

Gray, et al. "Transaction Processing: Concepts and Techniques" 13.5.1 Side Files, p. 723-732, Morgan Kaufmann Publishers, 1993.
Japanese Office Action for Japanese Patent Application No. 2023-516012 dated May 28, 2024.

* cited by examiner

MANAGEMENT DEVICE, DATABASE SYSTEM, MANAGEMENT METHOD, AND COMPUTER PROGRAM PRODUCT

CROSS-REFERENCE TO RELATED APPLICATIONS

This application is a Continuation of International Application No. PCT/JP2021/016480, filed on Apr. 23, 2021, the entire contents of which are incorporated herein by reference.

FIELD

Embodiments described herein relate generally to a management device, a database system, a management method, and a computer program product.

BACKGROUND

Importance of data generated from various applications, services, and devices is increasing day by day. For this reason, importance of a database system that manages enormous data generated from these is also increasing.

For the database system, not only responsiveness to a user request but also tolerance to and reliability of large-scale data are important. As such, the database system needs to maintain logical consistency of a database even when a failure such as a system failure or a transaction failure occurs due to hardware and a network.

Generally, a database system is required to satisfy four requirements, that is, atomicity, consistency, isolation, and durability (ACID). The database system maintains atomicity, consistency, and durability by performing commit/rollback in transaction management and recovery.

The database system implements recovery by, for example, a log method of performing in-place update or a shadow page method of not performing in-place update.

In a case of updating data, the database system adopting the log method writes a state before update as an UNDO log and writes a state determined by commit as a REDO log to a log file. Then, after a failure occurs, the database system returns to the state before update by using the UNDO log for the updated data before commit, and sets the data to be in a determined state by using the REDO log for the non-updated data after commit.

The database system adopting the shadow page method first secures a copy of a page before updating the page. The copied page, that is, the shadow page, is not referenced by any transaction. Therefore, by updating the shadow page, the database system can change the data without considering consistency or the like. Then, the database system atomically changes all the portions referring to the page before the change in such a way as to refer to a new page when the data change is completed and committed. As a result, the database system adopting the shadow page method can update a page without undermining consistency. For example, the database system atomically changes all the portions referring to the page before the change to refer to a new page by atomically switching a table at the time of commit using two page tables indicating a correspondence between a logical page and a physical page.

When comparing the log method and the shadow page method, it is said that the shadow page method is excellent in terms of ease of implementation and high-speed failure recovery, but the log method is excellent in performance.

Meanwhile, the following three points can be mentioned as problems of the shadow page method according to the related art.

(1) A Large-Sized Page Table is Required.

For example, Patent literature 1 (JP 4104586 B2) describes that, in a case where a page size is 2 KB and a size of one element of a page table is 4B, a memory of 4 GB is required for a page table in a database of 1 TB.

(2) Repetitive Page Update Easily Results in Fragment.

In a case where securing of a new page is repeated, the continuity between pages is lost, which results in fragmentation in a storage device. Therefore, in the database system adopting the shadow page method, random page writing and reading increase. Therefore, for example, in a case where the storage device is a hard disk drive, a data access speed of the database system decreases.

(3) The Cost of Commit is High, and Compatibility with Simultaneous Execution is Also Poor.

The database system adopting the shadow page method needs to perform flash processing of writing data on a page buffer to the storage device and write the data to a page table at the time of commit. For example, in a database system that manages a database of 1 TB in which a page size is 2 KB and a size of one element of a page table is 4B, page tables are written in the order of several GB.

Due to the above problems, it is not practical for a database system that manages a large-scale database to adopt the shadow page method.

Meanwhile, in Patent literature 1, a file system is described that is cable of reducing a size of a map table corresponding to a page table in the shadow page method and preventing fragmentation of file data.

The file system of Patent literature 1 reduces the size of the page table by applying the page table only to writing to a page in a temporary write area. In addition, the file system of Patent literature 1 prevents fragmentation of file data by processing of writing back a page in the temporary write area to an original page position of a file area. In addition, the file system of Patent literature 1 writes a list of valid pages in the temporary write area to the page table. As described above, the file system of Patent literature 1 reduces the size of the page table and the cost at the time of commit.

The file system of Patent literature 1 solves the problems of the shadow page method. However, the file system of Patent literature 1 also has the following three new problems.

(4) The Incidental Processing Cost Increases.

In the file system of Patent literature 1, processing of writing back a page in the temporary write area to the original page position of the file area, which is called actual update processing, is newly added.

(5) Overhead Occurs During Page Access.

In an exemplary file system of Patent literature 1, the cost when referring to the map table holding a page update list is high. The file system of Patent literature 1 needs to extract page update information from an index called a map. This information extraction processing is more costly than referring to fixed-length array data.

(6) Implementation Becomes Complicated.

The file system of Patent literature 1 needs to prepare a complicated mechanism such as actual update processing. Therefore, the file system of Patent literature 1 is more complicated in implementation than the shadow page method.

[Non Patent Literature 1] "Transaction Processing (Concepts and Techniques)", written by Jim Gray and Andreas Reuters, and translated by Masaru Kitsuregawa, vol. 2, Clause 13.5.1, Side File, Nikkei Business Publications, Inc., Oct. 20, 2001, p. 860-870

DETAILED DESCRIPTION

Figure 1:
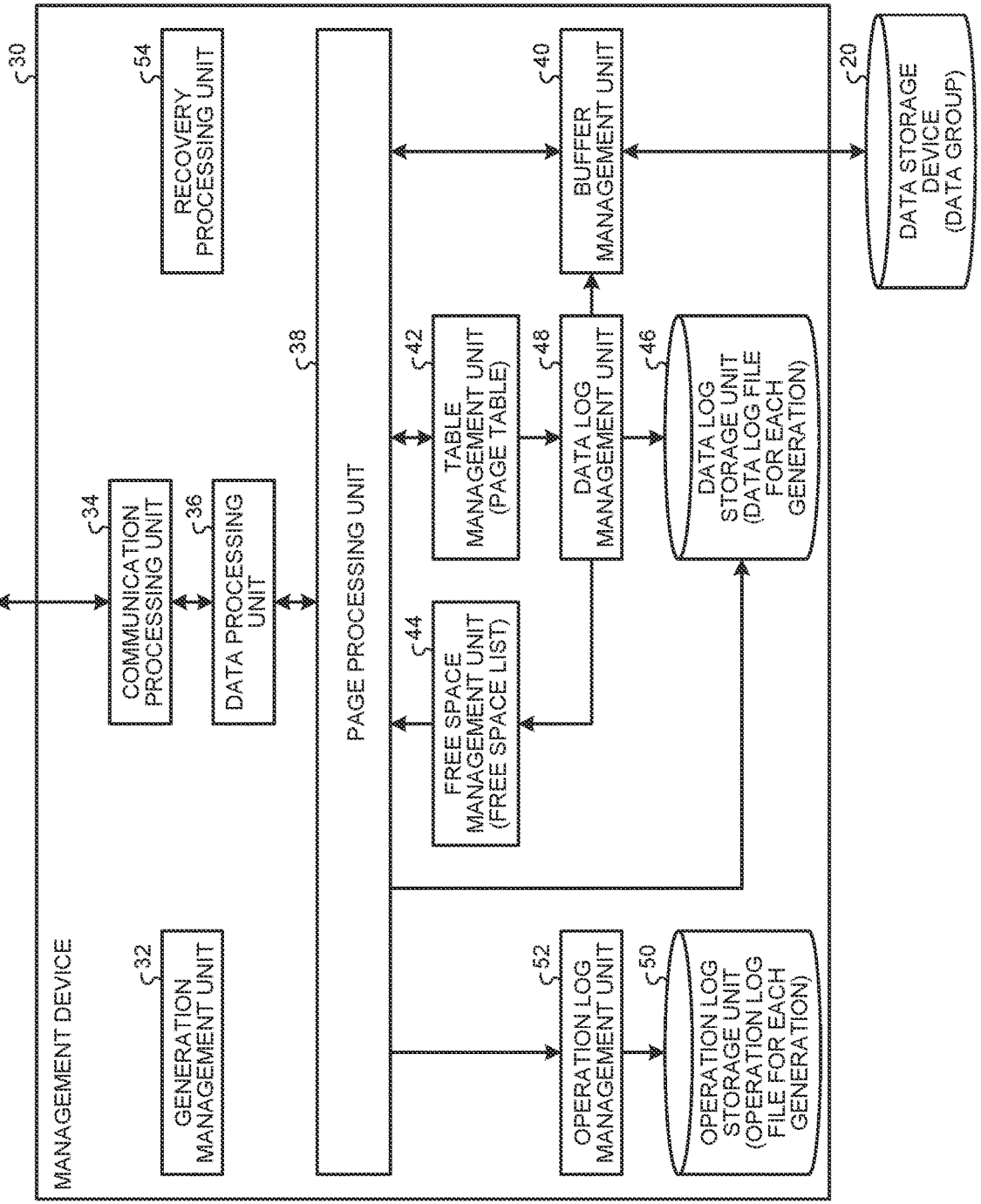
FIG. 1 is a diagram illustrating a configuration of a database system according to an embodiment.

In recent years, technological progress of software, hardware, a network, and the like has enabled utilization of data that was conventionally dormant because it could not be handled due to issues such as speed or capacity. For this reason, there is an increasing trend of utilizing big data for accumulating and analyzing the enormous data.

The problems of the shadow page method are to be re-evaluated on the premise of such recent technical progress.

First, the problem that "(2) repetitive page update easily results in fragment" is to be re-evaluated.

In an information processing device, a capacity of a main storage memory is increasing, and it is common to mount a memory of several tens of GB to several TB. For this reason, in a database system, a larger page size is often set as the capacity of the main storage memory increases. For example, Hadoop, which is a database engine specialized for batch processing with big data, sets a page size (block size) to 64 MB or 128 MB by default.

In a case where the page size is large, a data amount when writing or reading one page increases even in a case of random page writing or reading. As a result, a data transfer time increases and a proportion of an average waiting time in an average access time decreases, and it is thus considered that the demerit due to fragment on a storage device becomes relatively small. In a case where the storage device is a hard disk drive, the average access time is expressed as follows.

Average access time=average waiting time+data transfer time Data transfer time=average seek time+average rotational latency+data transfer time Next, the problem of "(1) A large-sized page table is required" is to be re-evaluated.

With the big data era, it has become necessary for a database system to handle a massive database on the order of several PB. In a case where a database on the order of several PB is handled by the shadow page method, the size of the page table is several TB. Therefore, the database system adopting the shadow page method needs to reduce the size of the page table.

Finally, the problem of "(3) The cost of commit is high, and compatibility with simultaneous execution is also poor" is to be re-evaluated.

In a case where the size of the page table has significantly increased, the processing cost for writing the entire page table increases in commit processing. In addition, in the commit processing, flash processing of writing data on a page buffer to the storage device is executed. However, in a case where the page size is large, the processing time of the commit processing becomes long even in a case of the storage device with high throughput performance.

In view of the above re-evaluation, a database system that solves the problems of the shadow page method, particularly the problems (1) and (3), while keeping the ease of implementation, which is the merit of the shadow page method, is required to handle a large-scale database.

An object of the embodiments herein is to provide a management device, a database system, a management method, and a computer program product capable of reducing a size of a page table while adopting a method of writing updated data to a free space in a case of updating.

According to an embodiment, a management device managing a data group stored in a data storage device by dividing the data group into a plurality of pages includes one or more hardware processors configured to function as a generation management unit, a page processing unit, a table management unit, a data log management unit, and an operation log management unit. The generation management unit increases a generation of the data group as time elapses. The page processing unit executes a page operation that is page-unitary change processing, for the data group.

The table management unit manages a page table that associates, for each of the plurality of pages, a logical address. The physical address indicates a space secured for a corresponding page in the data storage device and a last execution generation indicates the generation in which the page operation is executed last for the corresponding page. The data log management unit manages a data log file including a data log indicating a correspondence between the logical address and the physical address for each generation. The operation log management unit manages an operation log file including an operation log indicating a content and an execution order of the page operation executed in a corresponding generation for each generation. In a case where the page operation is executed for any one of the plurality of pages, the table management unit updates an entry related to the page subjected to the page operation in the page table. The page processing unit secures, in a case where update processing, which is one of page operations, is executed first in a current generation for any update target page among the plurality of pages, a free space in the data storage device to store data of the update target page, and updates the update target page on the secured free space. Additionally, the page processing unit adds, to the data log file of the current generation, a CPUNDO log that is the data log indicating a correspondence between the logical address and the physical address indicating a position of data at start of the current generation in the update target page. The data log management unit writes the data at the start of the current generation to a position indicated by the physical address of the page table in the data storage device for an immediately previous operation page subjected to the page operation in an immediately previous generation among the plurality of pages. Additionally, the data log management unit adds, to the data log file of the current generation, a CPREDO log that is the data log indicating a correspondence between the logical address and the physical address to which the data at the start of the current generation is written in the immediately previous operation page. Hereinafter, a database system 10 according to an embodiment will be described with reference to the drawings.

FIG. 1 is a diagram illustrating a configuration of the database system 10 according to the embodiment.

The database system 10 includes a data storage device 20 and a management device 30.

The data storage device 20 stores a data group included in a database. The data storage device 20 is a non-volatile storage device. The data storage device 20 may be, for example, a hard disk drive or a storage system including a plurality of hard disk drives. Alternatively, the data storage device 20 may be a storage system in which a plurality of devices operate in cooperation via an interface or a network.

The management device 30 manages a data group stored in the data storage device 20 by dividing the data group into a plurality of pages. Each of the plurality of pages is a logical data unit for managing the data group, and is data with a predetermined fixed length. The management device 30 is an information processing device such as a computer.

The management device 30 receives a request from a client device via a network. The management device 30 reads a data group stored in the data storage device 20 and changes the data group in response to the request received from the client device. The management device 30 returns an execution result corresponding to the request to the client device via the network.

The management device 30 includes a generation management unit 32, a communication processing unit 34, a data processing unit 36, a page processing unit 38, a buffer management unit 40, a table management unit 42, a free space management unit 44, a data log storage unit 46, a data log management unit 48, an operation log storage unit 50, an operation log management unit 52, and a recovery processing unit 54.

The generation management unit 32 manages a generation of a data group stored in the data storage device 20. The generation management unit 32 increases the generation of the data group as time elapses. For example, the generation management unit 32 increases the generation every certain time, for example, every one minute, every five minutes, every ten minutes, or the like.

In the present embodiment, the generation management unit 32 manages the generation of the data group by using a generation number represented by an integer value. In the present embodiment, the generation management unit 32 updates the generation by incrementing (increasing) the generation number by 1 from a preset initial value (for example, 1).

The communication processing unit 34 receives a request from the client device via the network. The communication processing unit 34 transmits the received request to the data processing unit 36. The communication processing unit 34 receives an execution result of executing processing according to the request from the data processing unit 36. Then, the communication processing unit 34 transmits, as a response, the execution result to the client device via the network.

The data processing unit 36 processes a request from the client device. In a case where the data group is a relational database, the request is retrieval of a record, update of a record, creation of a record, deletion of a record, or the like. Entity data of a record is stored in one or more pages in the data group. In order to execute processing in response to the request, the data processing unit 36 calls the page processing unit 38 and causes the page processing unit 38 to execute reference processing or a page operation for one or more pages in which the entity data of the record is stored.

The page processing unit 38 executes the reference processing and the page operation as page-unitary change processing for the data group in response to the request from the data processing unit 36. Further details of the processing in the page processing unit 38 will be described later with reference to FIGS. 2, 5, 6, and 7.

The buffer management unit 40 reads a part of or the entire data group stored in the data storage device 20 and stores the read data group in a buffer memory. The page processing unit 38 executes the reference processing and the page operation on data stored in the buffer memory. As a result, the page processing unit 38 can access data faster than directly accessing the data storage device 20. The buffer management unit 40 performs processing of evacuating data that cannot be stored in the buffer memory and processing of reading data to be processed by the page processing unit 38, by using a replacement algorithm such as least recently used (LRU).

The table management unit 42 manages a page table. The page table associates, for each of the plurality of pages, a logical address, a physical address indicating a space secured for the corresponding page in the data storage device 20, and the last execution generation indicating a generation in which the page operation has been executed last for the corresponding page. The page table will be described in more detail below with reference to FIG. 3.

The free space management unit 44 manages a free space list. The free space list is a list of physical addresses of free spaces in the data storage device 20. Further details of the free space list will be described later with reference to FIG. 3.

The data log storage unit 46 stores a data log file for each generation. The data log storage unit 46 is a non-volatile storage device. The data log management unit 48 manages the data log file stored in the data log storage unit 46 for each generation. The data log file includes a data log indicating a correspondence between a logical address and a physical address. The data log file will be described later in more detail with reference to FIG. 4 and the like.

The operation log storage unit 50 stores an operation log file for each generation. The operation log storage unit 50 is a non-volatile storage device. The operation log management unit 52 manages the operation log file stored in the operation log storage unit 50 for each generation. The operation log file includes an operation log indicating a content and an execution order of the page operation. The operation log file will be described later in more detail with reference to FIG. 4 and the like.

In a case where a failure occurs in a data group, the recovery processing unit 54 recovers the page table, the free space list, and the data log file of the current generation. Then, at the time of failure occurrence, the recovery processing unit 54 recovers images of a plurality of pages included in the data group corresponding to a time point close to the time when the failure occurs. The processing in the recovery processing unit 54 will be described later in more detail with reference to FIGS. 12 to 15.

Figure 2:
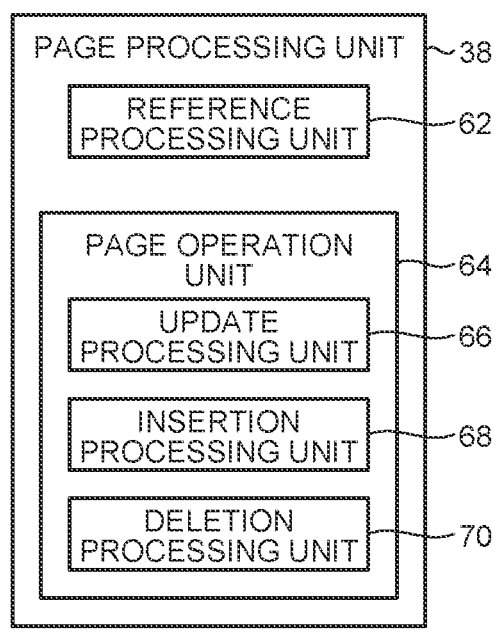
FIG. 2 is a diagram illustrating a functional configuration of a page processing unit.

FIG. 2 is a diagram illustrating a functional configuration of the page processing unit 38.

The page processing unit 38 includes a reference processing unit 62 and a page operation unit 64. The reference processing unit 62 performs the reference processing on the data group in response to a call from the data processing unit 36. For example, the reference processing unit 62 reads data of a page of a logical address designated by the data processing unit 36 from the buffer memory managed by the buffer management unit 40 and returns the data to the data processing unit 36.

The page operation unit 64 executes the page operation as the page-unitary change processing for the data group. The page operation unit 64 includes an update processing unit 66, an insertion processing unit 68, and a deletion processing unit 70.

The update processing unit 66 executes update processing, which is one of the page operations, in response to a call from the data processing unit 36. In the update processing, the update processing unit 66 updates data of any update target page among the plurality of pages. More specifically, the update processing unit 66 updates data of the update target page on the buffer memory managed by the buffer management unit 40. In addition, in the update processing, in a case where the update processing is first executed for the update target page in the current generation, the update processing unit 66 secures a free space in the data storage device 20 to store the data of the update target page, copies the data before update to the secured free space, and executes the update processing on the data copied to the secured free space. Further, in a case where the update processing is first executed for the update target page in the current generation, the update processing unit 66 adds a data log to the data log file of the current generation and changes an entry of the update target page in the page table. The update processing will be further described with reference to the flowchart of FIG. 5.

The insertion processing unit 68 executes insertion processing, which is one of the page operations, in response to a call from the data processing unit 36. In the insertion processing, the insertion processing unit 68 inserts a new page into the plurality of pages. More specifically, the insertion processing unit 68 secures a free space in the data storage device 20 to store data of the new page, adds a data log to the data log file of the current generation, and changes an entry of the new page in the page table. The insertion processing will be further described with reference to the flowchart of FIG. 6.

The deletion processing unit 70 executes deletion processing, which is one of the page operations, in response to a call from the data processing unit 36. The deletion processing unit 70 deletes any deletion target page among the plurality of pages in the deletion processing. More specifically, the deletion processing unit 70 adds a data log to the data log file of the current generation and changes an entry of the deletion target page in the page table. The deletion processing will be further described with reference to the flowchart of FIG. 7.

Figure 3:
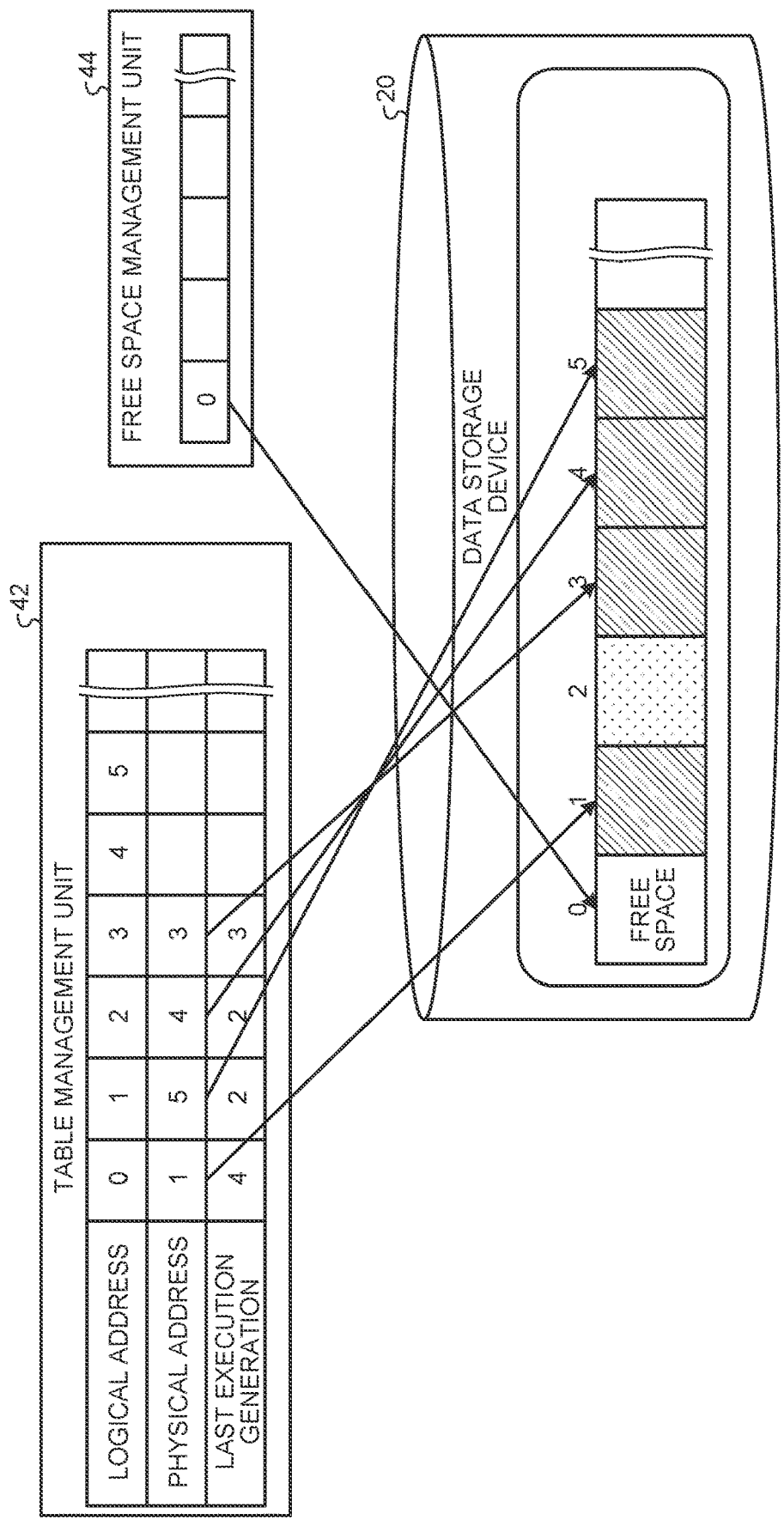
FIG. 3 is a diagram illustrating an example of a page table, a free space list, and a data group.

FIG. 3 is a diagram illustrating an example of the page table, the free space list, and the data group.

The table management unit 42 manages a page table. The data group is managed by being divided into a plurality of pages. The page is data having a predetermined data length. The page has a data length of, for example, 1 MB or 4 MB.

A unique logical address is assigned to each of the plurality of pages. Data of each of the plurality of pages is recorded in a space secured for the corresponding page in the data storage device 20.

In the page table, the logical address, the physical address, and the last execution generation are associated for each of the plurality of pages. The physical address indicates the position of the space secured for the corresponding page in the data storage device 20. In the present embodiment, the physical address is represented by an offset amount from a reference position. Since the data of the page has the predetermined data length, the offset may be represented by an integer. In this case, the management device 30 can access the corresponding space in the data storage device 20 by seeking from the reference position by the number of bytes obtained by multiplying the physical address (offset) by the predetermined data length.

The page is generated by the insertion processing, the data is changed by the update processing, and the page is deleted by the deletion processing. The last execution generation indicates a generation in which the page operation has been executed last for the corresponding page. The last execution generation represents a generation at a time point when the corresponding page is last operated.

The page table also manages an unused page. The page table stores a value (for example, −1) indicating that the corresponding page is not used, as the physical address of the unused page.

The table management unit 42 manages only one page table. Therefore, the table management unit 42 can reduce the size of the page table as compared with a shadow page method that needs to manage two page tables.

The free space management unit 44 manages a free space list. The free space list is a list of physical addresses of free spaces in the data storage device 20. The free space is a space that is not secured for any of the plurality of pages in the data storage device 20.

For example, the free space management unit 44 stores and manages the physical address of the free space in a queue. The free space management unit 44 receives the physical address of the free space from the data log management unit 48 and stores the physical address in the queue. In addition, in response to a request from the page processing unit 38, the free space management unit 44 extracts the physical address of the free space from the queue and passes the physical address to the page processing unit 38, and deletes the extracted physical address from the queue.

Figure 4:
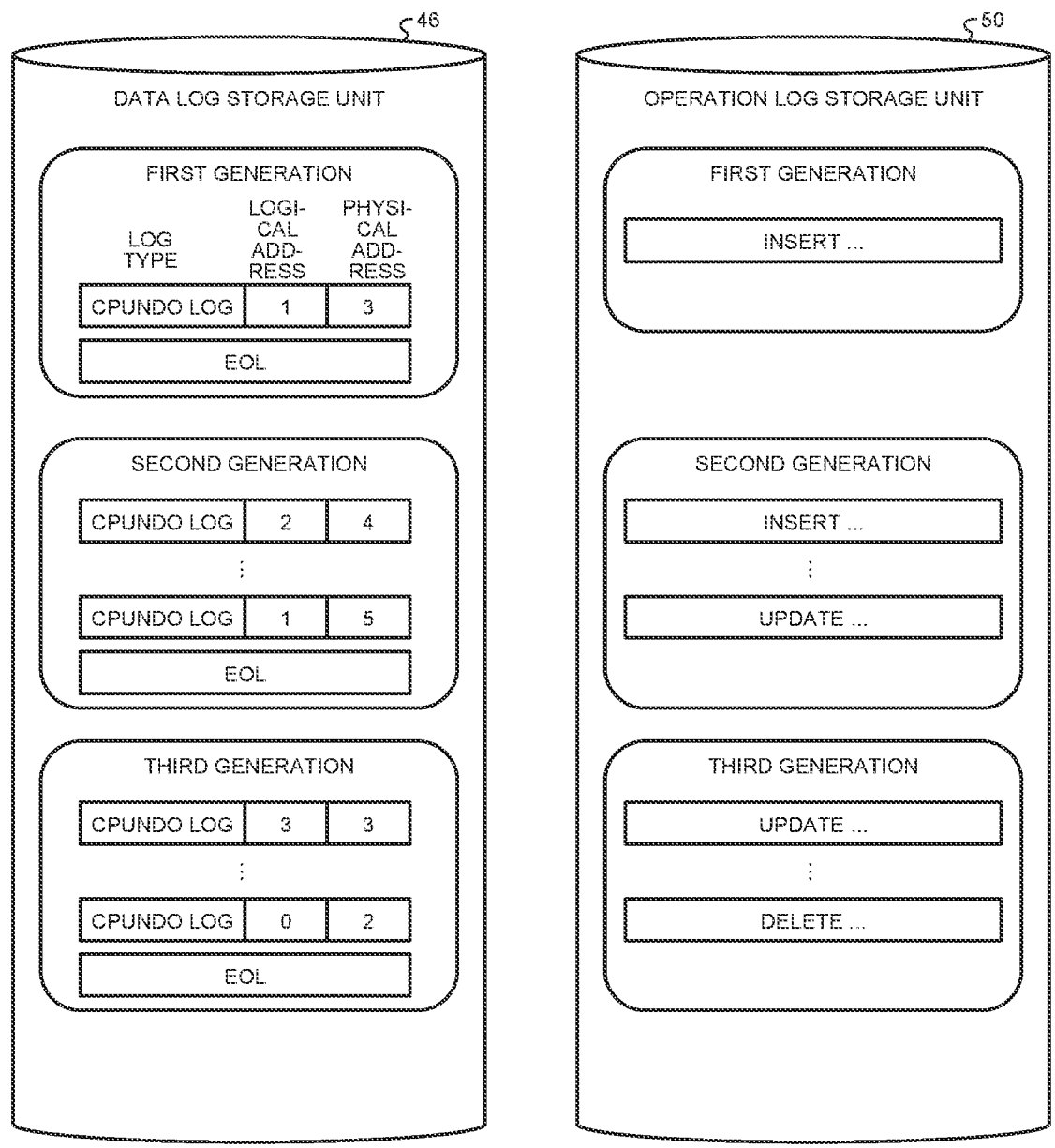
FIG. 4 is a diagram illustrating an example of a data log file and an operation log file.

FIG. 4 is a diagram illustrating an example of the data log file and the operation log file.

Every time the page processing unit 38 executes the page operation, the operation log management unit 52 adds an operation log indicating the content and the execution order of the page operation to the operation log file of the current generation stored in the operation log storage unit 50.

For example, in a case where the page processing unit 38 has executed the update processing, the insertion processing, or the deletion processing, the operation log management unit 52 adds an operation log indicating the content of the executed processing, the logical address and physical address of the page for which the processing has been executed, and the execution order to the operation log file of the current generation. As a result, the management device 30 can recover a data image of a data group at the end of a predetermined generation by re-executing one or more page operations indicated in an operation log included in an operation log file of the predetermined generation according to the execution order for a data image of a data group at the start of the predetermined generation. The generation is managed by the generation management unit 32. In a case where the generation is increased by the generation management unit 32, the operation log management unit 52 generates an operation log file of a new generation and changes an operation log file to which an operation log is to be added.

The data log management unit 48 manages a data log file including a data log indicating a correspondence between a logical address and a physical address for each generation, the data log file being stored in the data log storage unit 46.

The data log includes a CPUNDO log, a CPREDO log, and end information (End of Log (EOL)). The CPUNDO log and the CPREDO log each include log type information for identifying a type, a logical address, and a physical address.

The CPUNDO log is added to the data log file by the page processing unit 38. The CPUNDO log indicates a correspondence between a logical address and a physical address for a page subjected to the page operation in the generation of the data log file. In a case where the update processing is executed, the physical address included in the CPUNDO log indicates a position of data of the corresponding page at the start of the generation of the data log file. In addition, in a case where the insertion processing is executed, the physical address included in the CPUNDO log is a value indicating that there is no data. In addition, in a case where the deletion processing is executed, the physical address included in the CPUNDO log indicates a position in a deletion target page.

The CPREDO log is added to the data log file by the data log management unit 48. The CPREDO log indicates a correspondence between a logical address and a physical address indicating a position of data at the start of the generation of the data log file for the immediately previous operation page subjected to the page operation (the update processing or insertion processing) in the immediately previous generation of the data log file. Alternatively, the CPREDO log indicates a correspondence between a logical address and a physical address indicating a position of data at the start of the generation of the data log file for a non-updated page that is not subjected to the update processing or insertion processing since the latest N generations (N is an integer of 1 or more) including the generation of the data log file. The CPREDO log for a page subjected to a deletion operation in the immediately previous generation is not generated because there is already no data at the start of the generation of the data log file.

The end information (EOL) is added to the data log file by the data log management unit 48. The end information indicates that the data log is normally added for all the immediately previous operation pages and all the non-updated pages included in the plurality of pages of the generation of the data log file.

Figure 5:
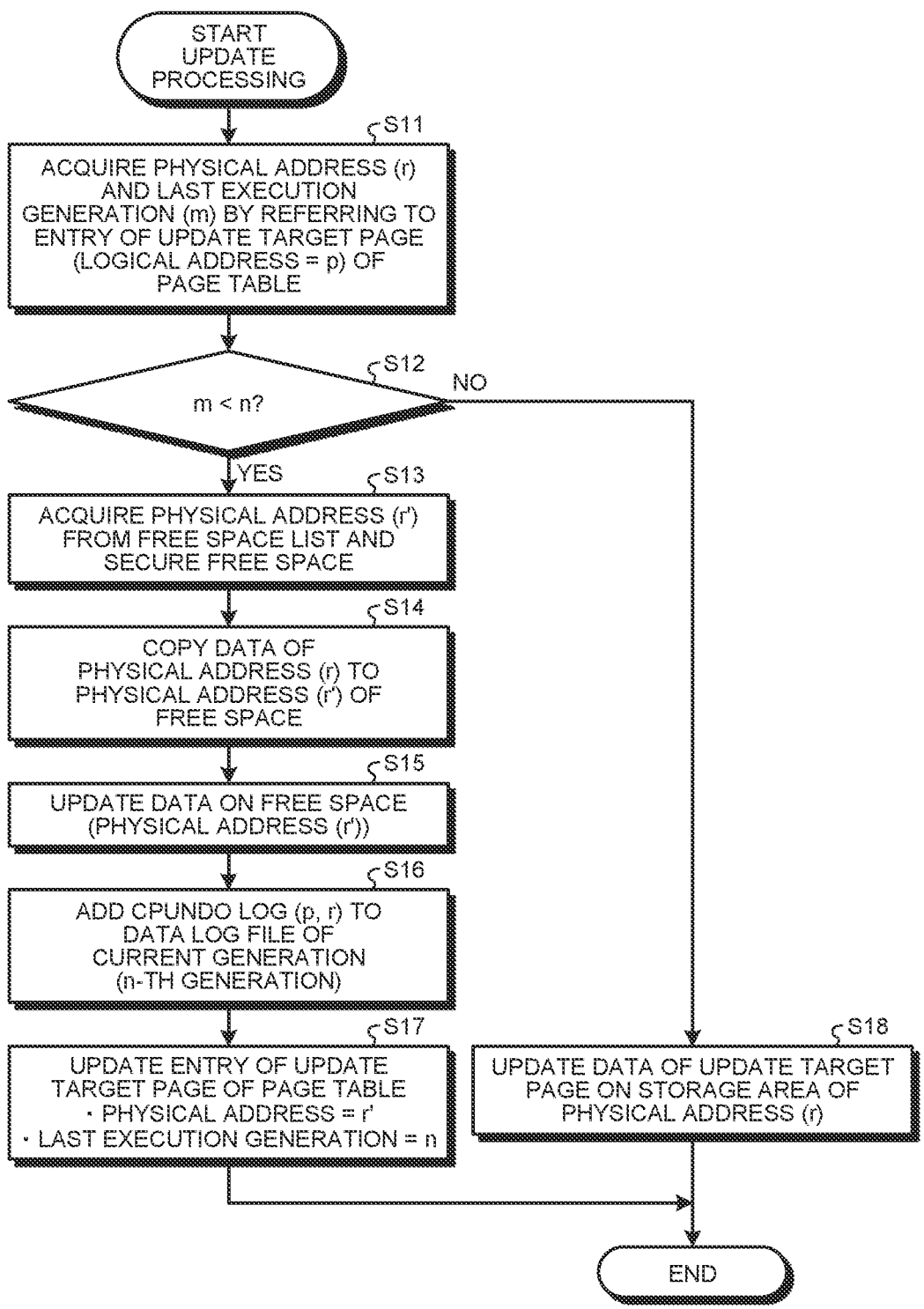
FIG. 5 is a flowchart illustrating a flow of update processing.

FIG. 5 is a flowchart illustrating a flow of the update processing. When executing the update processing, the page processing unit 38 executes the processing according to the flow illustrated in FIG. 5. It is assumed that a generation number of the current generation is n (n is an integer of 1 or more).

First, in S11, the page processing unit 38 acquires a physical address (r) and the last execution generation (m) of an update target page by referring to an entry of the update target page (logical address=p) of the page table.

Subsequently, in S12, the page processing unit 38 determines whether or not to execute the update processing for the update target page first in the current generation. For example, the page processing unit 38 determines whether or not m<n. In a case where the update processing has already been executed on the update target page in the current generation, that is, in a case where the current update processing is the second or subsequent update processing in the current generation, the last execution generation (m) is the current generation (n). However, in a case where the update processing is first executed on the update target page in the current generation, the last execution generation (m) is smaller than the current generation (n).

In a case where it is determined that the update processing is first executed on the update target page in the current generation, for example, in a case where m is smaller than n (Yes in S12), the page processing unit 38 advances the processing to S13.

In S13, the page processing unit 38 acquires a physical address (r') of a free space from the free space list. Then, the page processing unit 38 secures the acquired free space (physical address (r')) as a space for storing data of the update target page. Further, the page processing unit 38 deletes the acquired physical address (r') of the free space from the free space list.

Then, in S14, the page processing unit 38 copies the data of the physical address (r) of the update target page to the physical address (r') of the free space. Subsequently, in S15, the page processing unit 38 executes the update processing on the data copied to the physical address (r') of the free space. As a result, the page processing unit 38 can execute the update processing on the new physical address (r') while leaving the data before update in the update target page at the original physical address (r). The buffer management unit 40 reads data of a page that is a page operation target from the data storage device 20 and stores the data in the buffer memory. Then, the page processing unit 38 updates the page operation on the buffer memory. Therefore, the page processing unit 38 executes the processing of S14 and S15 on the buffer memory.

Subsequently, in S16, the page processing unit 38 adds, to the data log file of the current generation (a data log file of an n-th generation), a CPUNDO log (p,r) indicating a correspondence between the logical address (p) of the update target page and the physical address (r) indicating the position of the data at the start of the current generation in the update target page.

Then, in S17, the page processing unit 38 gives an instruction to update the entry of the update target page of the page table to the table management unit 42. Specifically, the page processing unit 38 changes the physical address of the entry corresponding to the logical address (p) to r', and changes the last execution generation of the entry corresponding to the logical address (p) to n. Then, when the processing of S17 is completed, the page processing unit 38 ends this flow.

On the other hand, in a case where it is determined in S12 that the second or subsequent update processing is executed for the update target page in the current generation, for example, in a case where m is not smaller than n (No in S12), the page processing unit 38 advances the processing to S18.

In S18, the page processing unit 38 updates the data of the update target page on the storage area of the current physical address (r) of the update target page. In this case, the page processing unit 38 executes the update processing of the data of the update target page on the buffer memory. Then, when S18 is completed, the page processing unit 38 ends this flow.

In a case where the update processing is executed in S18, the page processing unit 38 does not change the physical address (r) and the last execution generation (m) of the update target page. As a result, in a case where the second or subsequent update processing is executed in the current generation, the page processing unit 38 can execute the processing on the update target page at a high speed.

As described above, in a case where the update processing is first executed on any update target page among the plurality of pages in the current generation, the page processing unit 38 secures the free space in the data storage device 20 as a space for storing the data of the update target page, and updates the update target page on the secured free space. As a result, the page processing unit 38 can update the data in another free space while leaving the data before update in the update target page at the original position. Therefore, the page processing unit 38 can update the data on the free space that is not referred to by any transaction. As a result, the page processing unit 38 can change the data of the update target page without considering consistency or the like.

In addition, in a case where the update processing is first executed on the update target page in the current generation, the page processing unit 38 stores the updated data in the free space, and thus, it is possible to leave the data before update (that is, the data of the update target page at the start of the current generation) at the original position (the physical address (r) before update). Then, the page processing unit 38 adds, to the data log file of the current generation, the CPUNDO log that is a data log indicating the correspondence between the logical address and the physical address indicating the position of the data at the start of the current generation in the update target page. As a result, in a case where a failure occurs after the current generation, the page processing unit 38 can recover the data before update of the update target page in the current generation, that is, the data of the update target page at the start of the current generation, based on the data log file of the current generation and the data left in the data storage device 20.

Furthermore, in a case where the update processing is first executed on the update target page in the current generation, the table management unit 42 adds the CPUNDO log to the data log file of the current generation, and then updates the entry related to the page subjected to the update processing in the page table. As a result, the table management unit 42 can change the page table in a state where the change of the update target page is completed and the data is determined. Therefore, the table management unit 42 can implement consistent table management only with one page table.

Furthermore, in a case where the second or subsequent update processing is executed for the update target page in the current generation, the page processing unit 38 updates the data at the same position without changing the physical address and without securing the free space. As a result, the page processing unit 38 can execute free space securing processing for each of the plurality of pages once at the maximum for each generation, and thus, it is possible to reduce a storage capacity and a processing cost for data recovery.

Furthermore, in a case where the update processing is executed first on the update target page in the current generation, the page processing unit 38 acquires the physical address from the free space list to secure the free space, and deletes the acquired physical address from the free space list. Since the page processing unit 38 can detect the free space by accessing the free space list implemented by the queue or the like, the processing cost for securing the free space for executing the update processing can be reduced.

Figure 6:
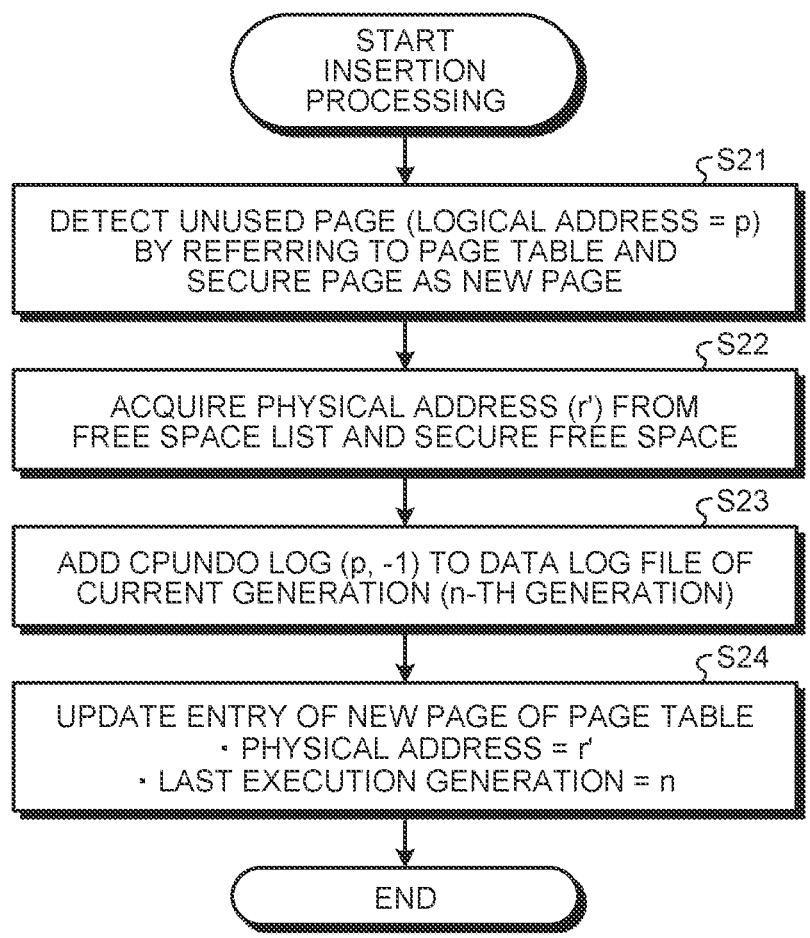
FIG. 6 is a flowchart illustrating a flow of insertion processing.

FIG. 6 is a flowchart illustrating a flow of the insertion processing. When executing the insertion processing, the page processing unit 38 executes the processing according to the flow illustrated in FIG. 6.

First, in S21, the page processing unit 38 detects a logical address of an unused page (logical address=p) by referring to the page table, and secures the detected unused page as a new page.

In S22, the page processing unit 38 acquires a physical address (r') of a free space from the free space list. Then, the page processing unit 38 secures the acquired free space (physical address (r')) as a space for storing data of the new page. Further, the page processing unit 38 deletes the acquired physical address (r') of the free space from the free space list.

Subsequently, in S23, the page processing unit 38 adds, to the data log file of the current generation (the data log file of the n-th generation), a CPUNDO log (p,−1) indicating a correspondence between the logical address (p) of the new page and the physical address (−1) indicating that there is no data. The physical address indicating that there is no data is, for example, a value indicating a position or the like that does not actually exist in the data storage device 20. In the present embodiment, the page processing unit 38 includes −1 in the CPUNDO log as the physical address indicating that there is no data.

Then, in S24, the page processing unit 38 gives an instruction to update the entry of the new page of the page table to the table management unit 42. Specifically, the page processing unit 38 changes the physical address of the entry corresponding to the logical address (p) to r', and changes the last execution generation of the entry corresponding to the logical address (p) to n. Then, when the processing of S24 is completed, the page processing unit 38 ends this flow.

As described above, in a case where the insertion processing of inserting a new page into a plurality of pages is executed, the page processing unit 38 secures a free space in the data storage device 20 to store data of the new page. As a result, the page processing unit 38 can store the data of the new page in the free space. Therefore, the page processing unit 38 can add a new page to a plurality of pages without considering consistency or the like.

In addition, the page processing unit 38 adds, to the data log file of the current generation, the CPUNDO log that is a data log indicating the correspondence between the logical address and the physical address indicating that data is not stored in the data storage device 20 in the new page. As a result, even when a failure occurs after the current generation, the page processing unit 38 can recover the new page based on the data log file of the current generation.

In addition, in a case where the insertion processing is executed, the table management unit 42 adds the CPUNDO log to the data log file of the current generation, and then updates the entry related to the page subjected to the insertion processing in the page table. As a result, the table management unit 42 can change the page table in a state where the insertion of the new page is completed. Therefore, the table management unit 42 can implement consistent table management only with one page table.

In a case where the insertion processing is executed, the page processing unit 38 acquires the physical address from the free space list to secure the free space, and deletes the acquired physical address from the free space list. Since the page processing unit 38 can detect the free space by accessing the free space list implemented by the queue or the like, the processing cost for securing the free space for executing the update processing can be reduced.

Figure 7:
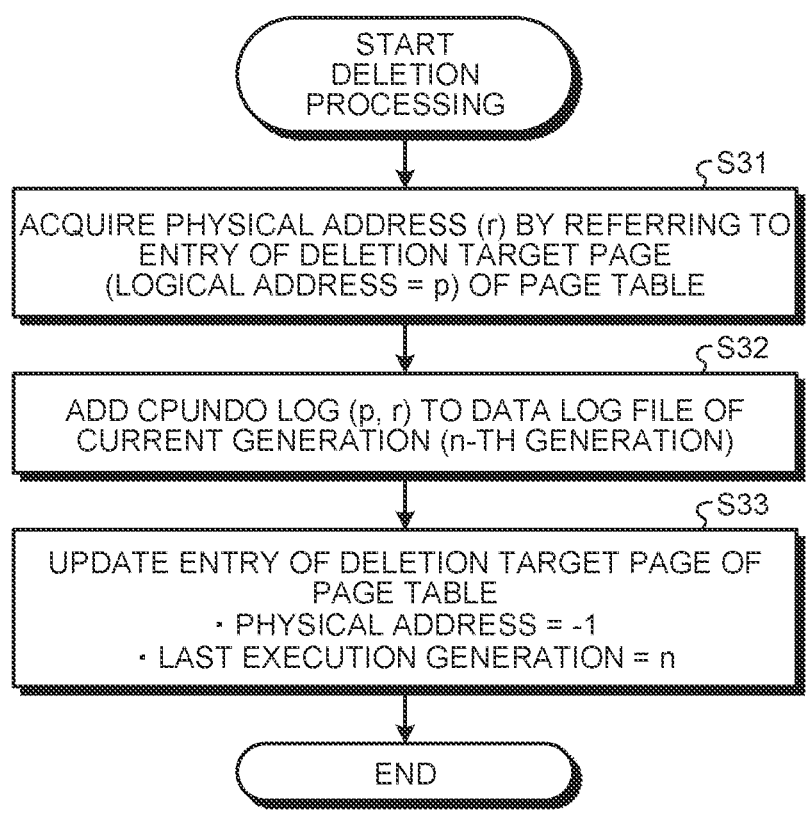
FIG. 7 is a flowchart illustrating a flow of deletion processing.

FIG. 7 is a flowchart illustrating a flow of the deletion processing. When executing the deletion processing, the page processing unit 38 executes the processing according to the flow illustrated in FIG. 7.

First, in S31, the page processing unit 38 acquires a physical address (r) of a deletion target page by referring to an entry of the deletion target page (logical address=p) of the page table.

Subsequently, in S32, the page processing unit 38 adds, to the data log file of the current generation (data log file of the n-th generation), a CPUNDO log (p,r) indicating a correspondence between the logical address (p) of the deletion target page and a physical address (r) indicating the position of the deletion target page in the data storage device 20.

Then, in S33, the page processing unit 38 gives an instruction to update the entry of the deletion target page of the page table to the table management unit 42. Specifically, the page processing unit 38 changes the physical address of the entry corresponding to the logical address (p) to a value (for example, −1) indicating an unused page, and changes the generation number of the entry corresponding to the logical address (p) to n (i.e. last execution generation=n). Then, when the processing of S33 is completed, the page processing unit 38 ends this flow.

As described above, in a case where the deletion processing of deleting any one of a plurality of pages is executed, the page processing unit 38 adds, to the data log file of the current generation, the CPUNDO log that is a data log indicating the correspondence between the logical address and the physical address indicating the position where the data of the deletion target page is stored in the deletion target page.

In addition, in a case where the deletion processing of deleting the deletion target page is executed for a plurality of pages, the table management unit 42 adds the CPUNDO log to the data log file of the current generation, and then updates the entry related to the page subjected to the deletion processing in the page table. As a result, the table management unit 42 can change the page table in a state where the deletion of the deletion target page is completed. Therefore, the table management unit 42 can implement consistent table management only with one page table.

Figure 8:
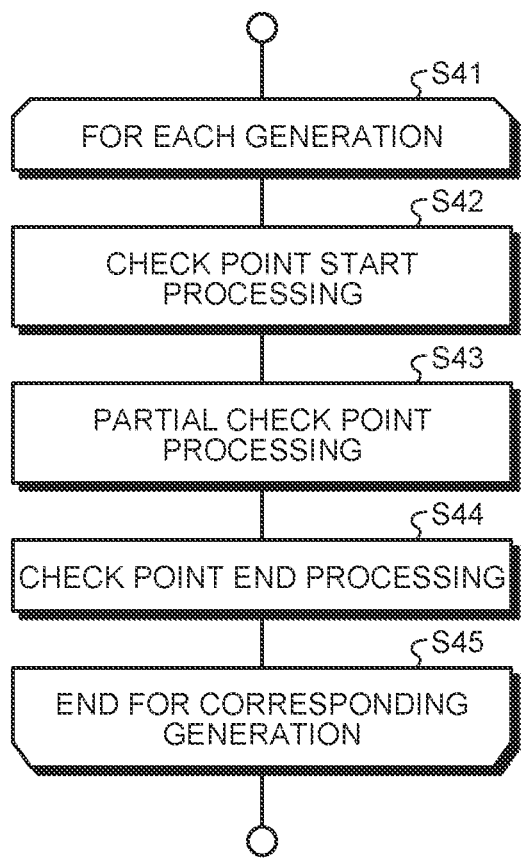
FIG. 8 is a flowchart illustrating a flow of processing for each generation in a management device.

FIG. 8 is a flowchart illustrating a flow of processing for each generation in the management device 30. The management device 30 repeats check point start processing in S42, partial check point processing in S43, and check point end processing in S43 for each generation (loop processing between S41 and S45). In the processing for each generation, the management device 30 executes the processing in the order of S42, S43, and S44.

Figure 9:
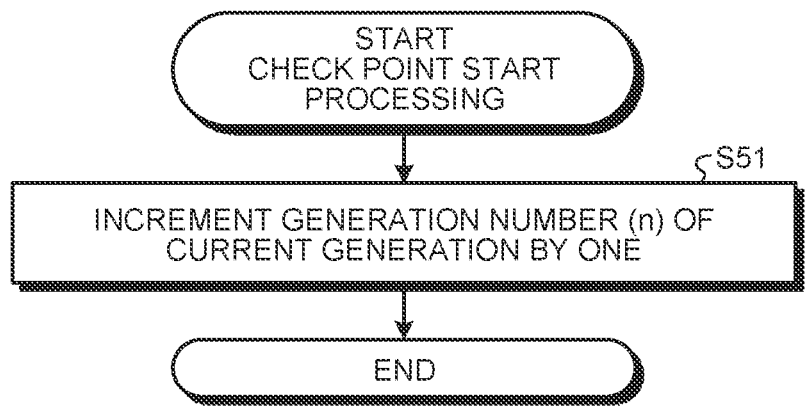
FIG. 9 is a flowchart illustrating a flow of check point start processing.

FIG. 9 is a flowchart illustrating a flow of the check point start processing (S42). In the check point start processing (S42), the generation management unit 32 executes the processing of S51. In S51, the generation management unit 32 increments (increases) the generation number (n) representing the current generation by 1. At the start of the operation, the generation management unit 32 sets the generation number (n) representing the current generation to a predetermined value, for example, 1.

Figure 10:
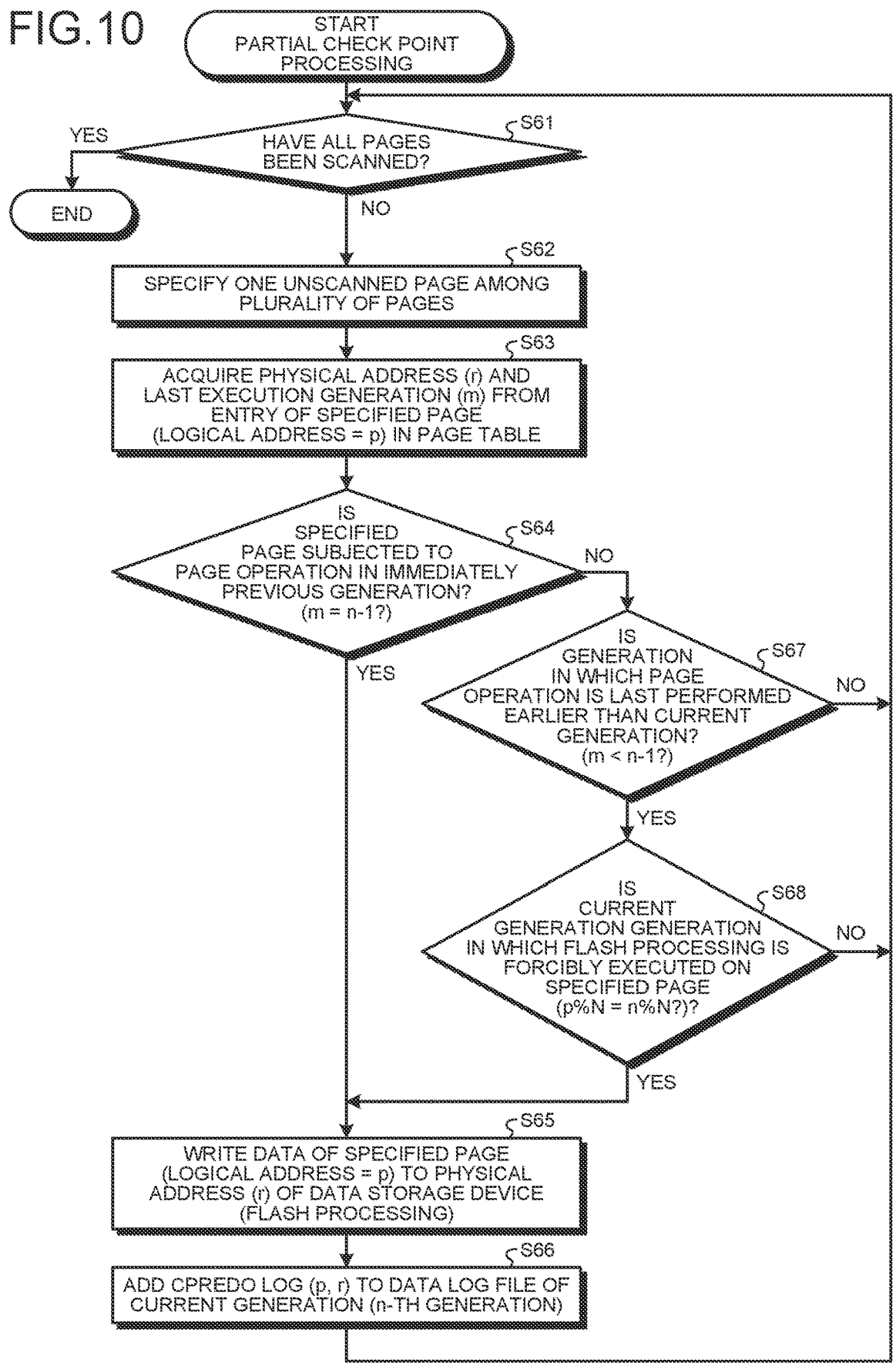
FIG. 10 is a flowchart illustrating a flow of partial check point processing.

FIG. 10 is a flowchart illustrating a flow of the partial check point processing (S43). In the partial check point processing (S43), the data log management unit 48 executes the processing of S61 to S68.

First, in S61, the data log management unit 48 determines whether or not all of the plurality of pages have been scanned by referring to the page table. In a case where all the pages have been scanned (Yes in S61), the data log management unit 48 ends this flow. In a case where not all the pages have been scanned (No in S61), the data log management unit 48 advances the processing to S62.

In S62, the data log management unit 48 specifies one unscanned page among the plurality of pages by referring to the page table. The plurality of pages do not include an unused page. That is, the data log management unit 48 does not select an unused page.

Subsequently, in S63, the data log management unit 48 acquires a physical address (r) and the last execution generation (m) by referring to an entry of the specified page (logical address=p) in the page table.

Then, in S64, the data log management unit 48 determines whether or not the specified page is subjected to the page operation in the immediately previous generation. For example, the data log management unit 48 determines whether or not m=n−1. The page subjected to the deletion processing is an unused page in the page table. Therefore, in a case where the specified page is subjected to the page operation, the content of the page operation is the update processing or the insertion processing.

In a case where the specified page is subjected to the page operation in the immediately previous generation (Yes in S64), the data log management unit 48 advances the processing to S65. In a case where the specified page is not subjected to the page operation in the immediately previous generation (No in S64), the data log management unit 48 advances the processing to S67.

In S65, the data log management unit 48 writes data of the specified page (logical address (p)) on the buffer memory to the physical address (r) of the specified page in the data storage device 20. That is, the data log management unit 48 causes the buffer management unit 40 to execute flash processing of writing the data of the physical address (r) to the data storage device 20. As a result, the data log management unit 48 can store the data of the page subjected to the page operation (the update processing or the insertion processing) in the previous generation in the non-volatile storage device, and can also recover the data when a failure occurs.

Subsequently, in S66, the data log management unit 48 adds, to the data log file of the current generation (the data log file of the n-th generation), a CPREDO log (p,r) indicating a correspondence between the logical address (p) of the specified page and the physical address (r) indicating the position of the data at the start of the current generation in the specified page. Then, when the processing of S66 is completed, the data log management unit 48 returns the processing to S61 and repeats the processing from S61.

In S67, the data log management unit 48 determines whether or not the last execution generation is earlier than the current generation. For example, the data log management unit 48 determines whether or not m<n−1. In a case where the last execution generation of the specified page is earlier than the current generation (Yes in S67), the data log management unit 48 advances the processing to S68. In a case where the last execution generation of the specified page is not earlier than the current generation, that is, in a case where the specified page is already subjected to the page operation in the current generation (No in S67), the data log management unit 48 returns the processing to S61 and repeats the processing from S61.

In S68, the data log management unit 48 determines whether or not the current generation is a generation in which the flash processing is forcibly executed on the specified page. The data log management unit 48 executes the flash processing of forcibly writing data of each of the plurality of pages to the data storage device 20 every N generations. The generation in which the flash processing is executed is set for each of the plurality of pages. For example, the flash processing is executed for each of the plurality of pages in a generation in which a remainder (p % N) when the logical address (p) is divided by N and a remainder (n % N) when the generation number (n) representing the current generation is divided by N coincide with each other.

In a case where the current generation is a generation in which the flash processing is forcibly executed on the specified page (Yes in S68), the data log management unit 48 advances the processing to S65. As a result, the data log management unit 48 can execute the flash processing of writing the data of the specified page to the data storage device 20 and add, to the data log file of the current generation (the data log file of the n-th generation), a CPREDO log (p,r) indicating a correspondence with the physical address (r) indicating the position of the data at the start of the current generation in the specified page.

In a case where the current generation is not a generation in which the flash processing is forcibly executed on the specified page (No in S68), the data log management unit 48 returns the processing to S61 and repeats the processing from S61.

In S68, the data log management unit 48 may select a page to be subjected to the flash processing in such a way that all pieces of data of the plurality of pages are written to the data storage device 20 in at least one of the latest N generations including the current generation. Therefore, for example, in S68, the data log management unit 48 may determine whether or not the specified page is a non-updated page that is not subjected to the update processing or the insertion processing in the latest N generations. Then, in a case where the specified page is a non-updated page, the data log management unit 48 advances the processing to S65. Then, in a case where the specified page is a non-updated page, the data log management unit 48 executes the flash processing of writing data in the non-updated page at the start of the current generation to the position indicated by the physical address of the page table in the data storage device 20. Further, in a case where the specified page is a non-updated page, the data log management unit 48 adds, to the data log file of the current generation, a CPREDO log indicating a correspondence between the logical address and the physical address to which the data at the start of the current generation is written in the non-updated page.

As described above, the data log management unit 48 writes data at the start of the current generation to the position indicated by the physical address of the page table in the data storage device 20 for the immediately previous operation page subjected to the page operation (the update processing or the insertion processing) in the immediately previous generation among the plurality of pages. Then, the data log management unit 48 adds, to the data log file of the current generation, a CPREDO log that is a data log indicating a correspondence between the logical address and the physical address to which the data at the start of the current generation is written in the immediately previous operation page.

As a result, even when a failure occurs after the current generation, the data log management unit 48 can recover the data of the immediately previous operation page in the current generation based on the data log file of the current generation and the data left in the data storage device 20.

The CPREDO log is not included in the data log file of the current generation for a page that is subjected to the page operation before the immediately previous generation and is not subjected to the page operation in the immediately previous generation. However, for such a page, the CPREDO log file is included in at least the data log file of the next generation in which the page operation is performed. That is, the data log management unit 48 includes the CPREDO log in the data log file of the next generation subjected to the page operation, for the page subjected to the page operation. As a result, in a case where a failure occurs after the current generation, the data log management unit 48 can recover the data of the current generation in the page subjected to the page operation, based on the data log files of a plurality of past generations including the current generation and the data left in the data storage device 20.

In addition, the data log management unit 48 adds the CPREDO log to the data log file of the current generation for a page subjected to the page operation in the immediately previous generation, and does not add the CPREDO log to the data log file of the current generation for a page that is not subjected to the page operation in the immediately previous generation. As a result, the data log management unit 48 can reduce the number of CPREDO logs to be added to the log file of the current generation, and thus, the data capacity of the data log file can be reduced, and the processing cost for adding data to the data log file can be reduced.

In addition, in the present embodiment, the data log management unit 48 writes data at the start of the current generation to the position indicated by the physical address of the page table in the data storage device 20 for a non-updated page that is not subjected to the update processing or the insertion processing in the latest N generations including the current generation. Then, the data log management unit 48 adds, to the data log file of the current generation, the CPREDO log indicating the correspondence between the logical address and the physical address to which the data at the start of the current generation is written in the non-updated page.

As a result, even when a failure occurs after the current generation, the data log management unit 48 can recover the data in the current generation for all of the plurality of pages based on the data log files of the latest N generations and the data left in the data storage device 20. In addition, since the physical address of the data at the start of the current generation is indicated in any of the data log files of the latest N generation for all of the plurality of pages, the data log management unit 48 can delete the data log file of the generation before the latest N generation.

N is an arbitrary integer of 1 or more, and is set by an administrator or the like. In a case where N is increased, the number of data log files increases. However, in a case where N is increased, the number of data logs included in each data log file can be decreased on average.

Figure 11:
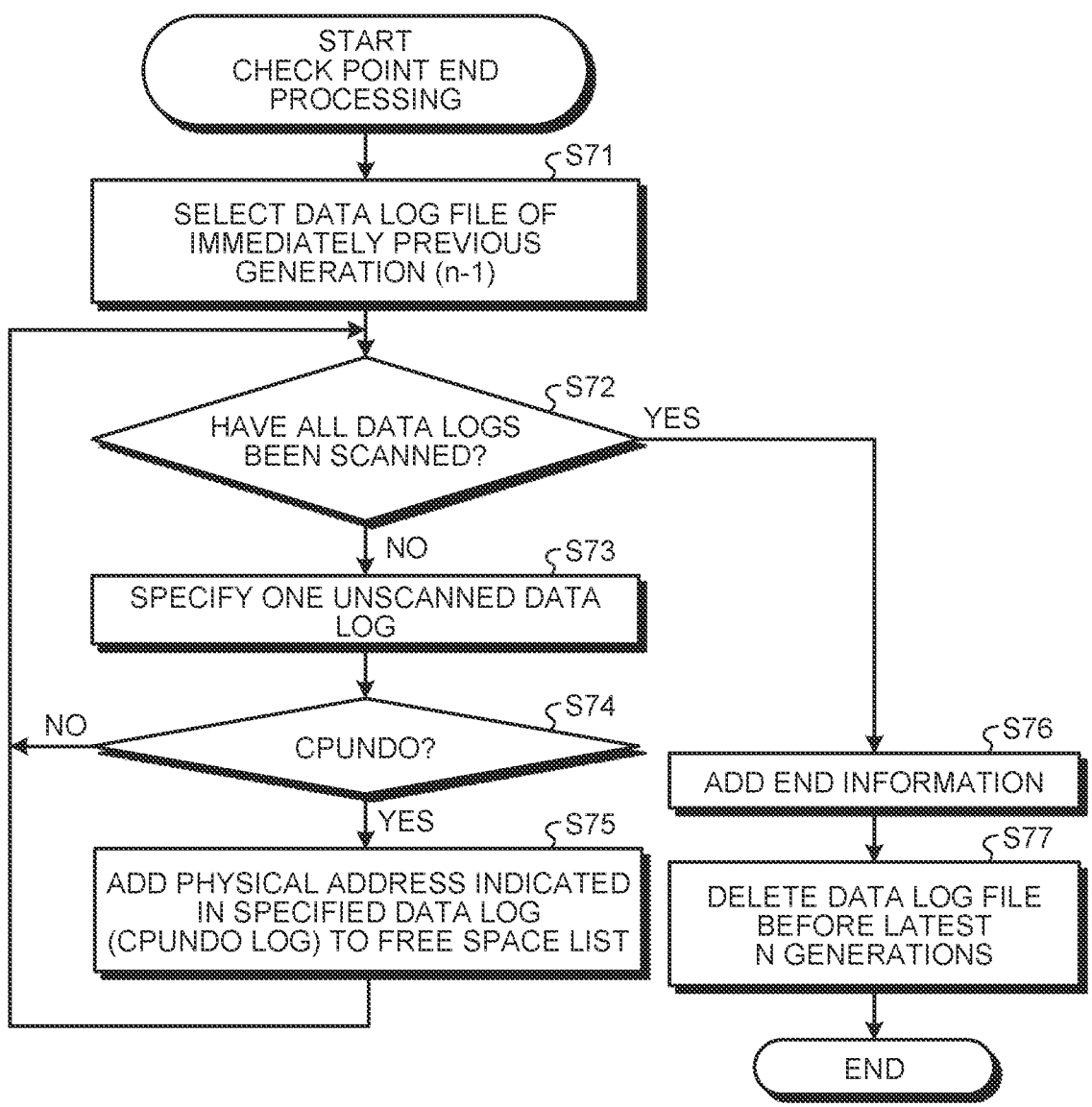
FIG. 11 is a flowchart illustrating a flow of check point end processing.

FIG. 11 is a flowchart illustrating a flow of the check point end processing (S44). In the check point end processing (S44), the data log management unit 48 executes the processing of S71 to S77.

First, in S71, the data log management unit 48 selects the data log file of the immediately previous generation (n−1).

Subsequently, in S72, the data log management unit 48 determines whether or not all the data logs included in the data log file of the immediately previous generation have been scanned. In a case where all the data logs included in the data log file of the immediately previous generation have been scanned (Yes in S72), the data log management unit 48 advances the processing to S76. In a case where not all the data logs have been scanned (No in S72), the data log management unit 48 advances the processing to S73.

In S73, the data log management unit 48 specifies one unscanned data log by referring to the data log file of the immediately previous generation (n−1). In S74, the data log management unit 48 determines whether or not the specified data log is a CPUNDO log. In a case where the specified data log is not a CPUNDO log (No in S74), the data log management unit 48 returns the processing to S72. In a case where the specified data log is a CPUNDO log (Yes in S74), the data log management unit 48 advances the processing to S75.

In S75, the data log management unit 48 adds the physical address indicated in the specified data log (CPUNDO log) to the free space list. When S75 is completed, the data log management unit 48 returns the processing to S72.

In S76, the data log management unit 48 adds the end information (EOL) to the data log file of the immediately previous generation (n−1). As a result, the data log management unit 48 can normally complete the addition of the data log to the data log file of the immediately previous generation (n−1).

Subsequently, in S77, the data log management unit 48 deletes the data log file before the latest N generations including the current generation. When the processing of S77 is completed, the data log management unit 48 ends this flow.

As described above, the data log management unit 48 adds the physical address indicated in the CPUNDO log included in the data log file of the immediately previous generation to the free space list. In the page subjected to the page operation in the immediately previous generation, the data after update is written to the data storage device 20 in S65 of the partial check point processing (S43), and the CPREDO log is added to the data log file of the current generation in S66. Therefore, the data before update in the page subjected to the page operation in the immediately previous generation is unnecessary for recovery at the time of failure occurrence. Accordingly, the data log management unit 48 can set a space in which the data before update is recorded in the page subjected to the page operation in the immediately previous generation as the free space. Therefore, the data log management unit 48 finds the free space in the data storage device 20 by detecting the CPUNDO log included in the data log file of the immediately previous generation. As a result, the data log management unit 48 can detect the free space by simple processing without executing processing such as scanning the page table, and the processing cost for detecting the free space can be reduced. In addition, since the data log management unit 48 can immediately allocate a new page to the free space, fragmentation can be suppressed.

Further, the data log management unit 48 adds the CPREDO log to the data log file of the current generation for all the immediately previous operation pages and all the non-updated pages included in the plurality of pages, and then adds the end information, which is a data log indicating that the addition of the data log is normally completed, to the data log file of the immediately previous generation. As a result, in a case where a failure occurs, the data log management unit 48 can easily determine a data log file that has been normally completed, that is, a data log file that can be recovered and used. In addition, since a data log file that does not include the end information is incomplete, the data log management unit 48 can prevent the data from being recovered by erroneously using the incomplete data log file in a case where a failure occurs.

In the present embodiment, the data log management unit 48 adds the end information to the data log file of the immediately previous generation, and then deletes the data log file of the generation before the latest N generations. As a result, the data log management unit 48 can reduce the number of data log files stored in the management device 30 and reduce the storage capacity and the management cost.

Figure 12:
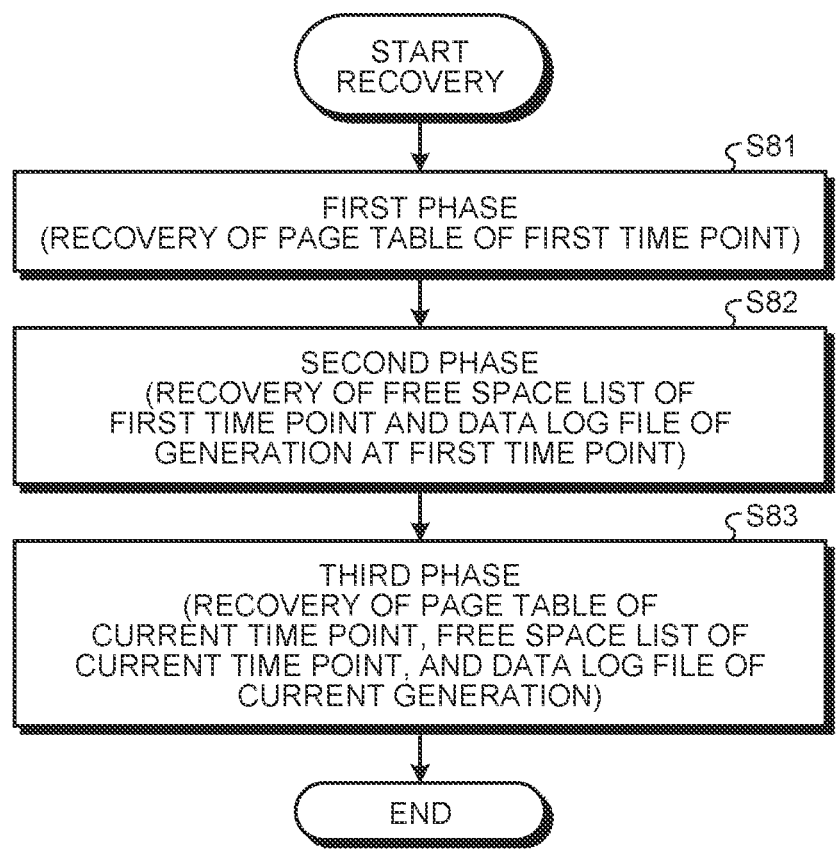
FIG. 12 is a flowchart illustrating a flow of recovery processing in a recovery processing unit.

FIG. 12 is a flowchart illustrating a flow of processing in the recovery processing unit 54 when a failure occurs.

In a case where a failure occurs in the data group, first, in S81, the recovery processing unit 54 executes processing of a first phase. In the first phase, the recovery processing unit 54 recovers the page table of a first time point before the occurrence of the failure by using the data log files of one or more generations before the occurrence of the failure in the data group.

Subsequently, in S82, the recovery processing unit 54 executes processing of a second phase. In the second phase, the recovery processing unit 54 recovers the free space list of the first time point and the data log file of the generation at the first time point based on the recovered page table of the first time point.

Subsequently, in S83, the recovery processing unit 54 executes processing of a third phase. In the third phase, the recovery processing unit 54 recovers the page table of the current time point, the free space list of the current time point, and the data log file of the current generation by using the data log file of the generation at the first time point and the operation log files of one or more generations after the generation at the first time point.

By executing the above processing, the recovery processing unit 54 recovers images of a plurality of pages included in the data group corresponding to a time point close to the time when the failure occurs. Hereinafter, the processing of each phase will be further described with reference to FIGS. 13 to 15.

Figure 13:
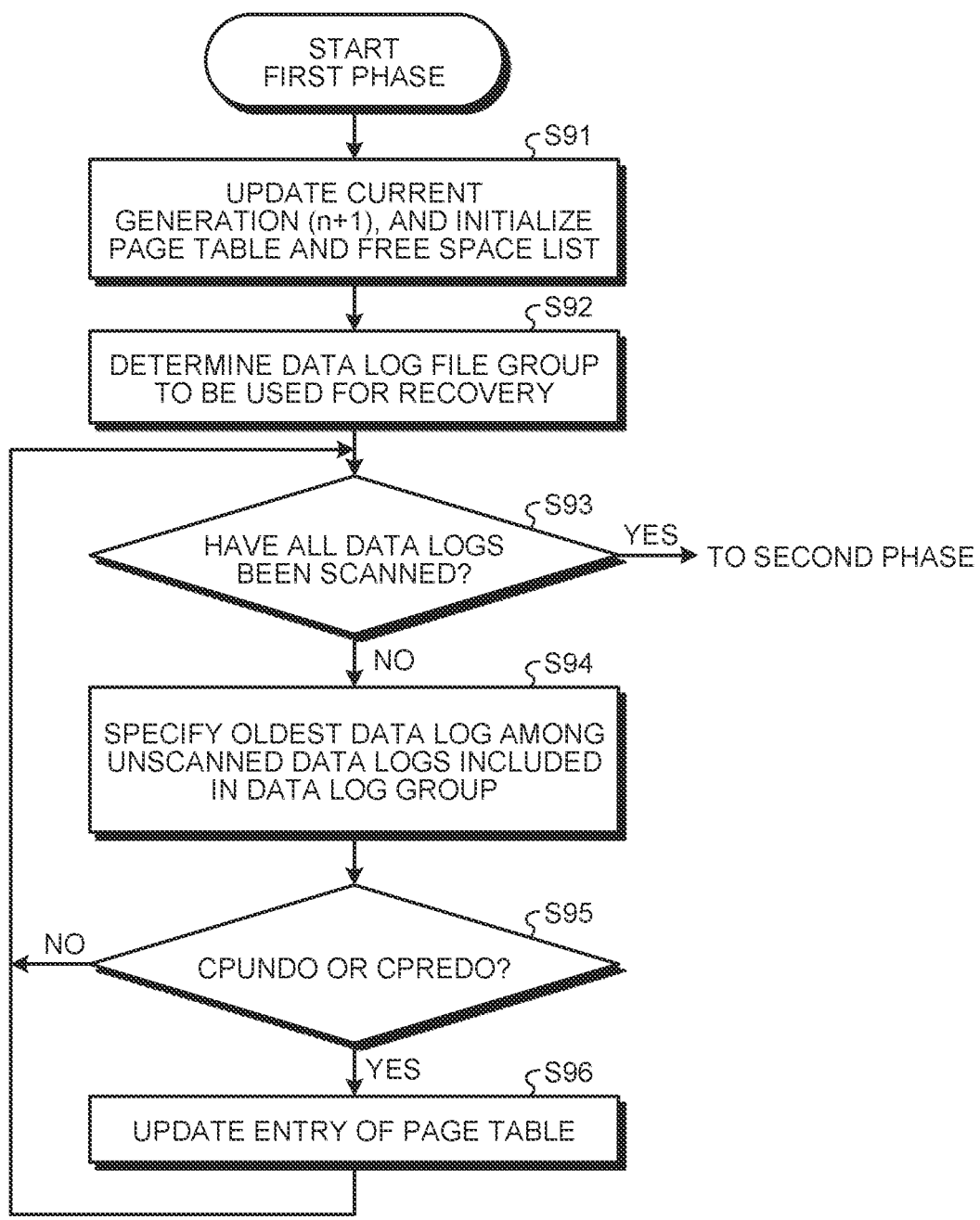
FIG. 13 is a flowchart illustrating a flow of processing of a first phase.

FIG. 13 is a flowchart illustrating a flow of the processing of the first phase. The recovery processing unit 54 starts the processing of the first phase from S91.

First, in S91, the recovery processing unit 54 adds 1 to the generation number to update the generation. Further, the recovery processing unit 54 initializes the page table and the free space list.

Subsequently, in S92, the recovery processing unit 54 determines a data log file group to be used for recovery. The data log file group to be used for recovery includes the data log files of one or more generations among successive generations before a failure occurs.

For example, the end information (EOL) is not added to the data log file due to the occurrence of the failure. Therefore, the recovery processing unit 54 sequentially selects a plurality of stored data log files from the data log file of the oldest generation, and confirms whether or not the end information (EOL) is included in the selected data log file. In a case where the data log file that does not include the end information (EOL) is confirmed, the recovery processing unit 54 determines, as the data log file group to be used for recovery, the data log files of one or more generations older by one generation than the data log file that does not include the end information (EOL). As a result, the recovery processing unit 54 can determine, as the data log file group, the data log files of one or more generations before the failure occurs.

In the present embodiment, the recovery processing unit 54 determines, as the data log file group to be used for recovery, the data log files of N generations. For example, in a case where the generation immediately before the time point when the failure occurs is a k-th generation (k is n or less), the recovery processing unit 54 determines, as the data log file group, N data log files from a first (k−N−1) generation to the k-th generation.

Subsequently, in S93, the recovery processing unit 54 determines whether or not all the data logs included in the data log file group have been scanned. In a case where all the data logs included in the data log file group have been scanned (Yes in S93), the recovery processing unit 54 advances the processing to the second phase. In a case where not all the data logs have been scanned (No in S93), the recovery processing unit 54 advances the processing to S94.

In S94, the recovery processing unit 54 specifies one oldest data log among unscanned data logs included in the data log file group. Subsequently, in S95, the recovery processing unit 54 determines whether or not the specified data log is the CPUNDO log or the CPREDO log. In a case where the specified data log is neither the CPUNDO log nor the CPREDO log, that is, in a case where the specified data log is the end information (EOL) (No in S95), the recovery processing unit 54 returns the processing to S93.

In a case where the specified data log is the CPUNDO log or the CPREDO log (Yes in S95), the recovery processing unit 54 advances the processing to S96.

In S96, the recovery processing unit 54 updates the entry of the page table based on the specified data log. That is, the recovery processing unit 54 writes the physical address indicated in the specified data log to the entry of the logical address indicated in the specified data log in the page table. In this case, the recovery processing unit 54 writes the latest generation (n+1) as the generation number of the entry of the logical address indicated in the specified data log.

Then, when the processing of S96 is completed, the recovery processing unit 54 returns the processing to S93.

In a case where the processing of the first phase described above is executed for all the data logs included in the data log file group, the recovery processing unit 54 can recover the page table at the first time point at which the failure has not occurred. In the present embodiment, the recovery processing unit 54 can recover the page table at a start point in the k-th generation.

Figure 14:
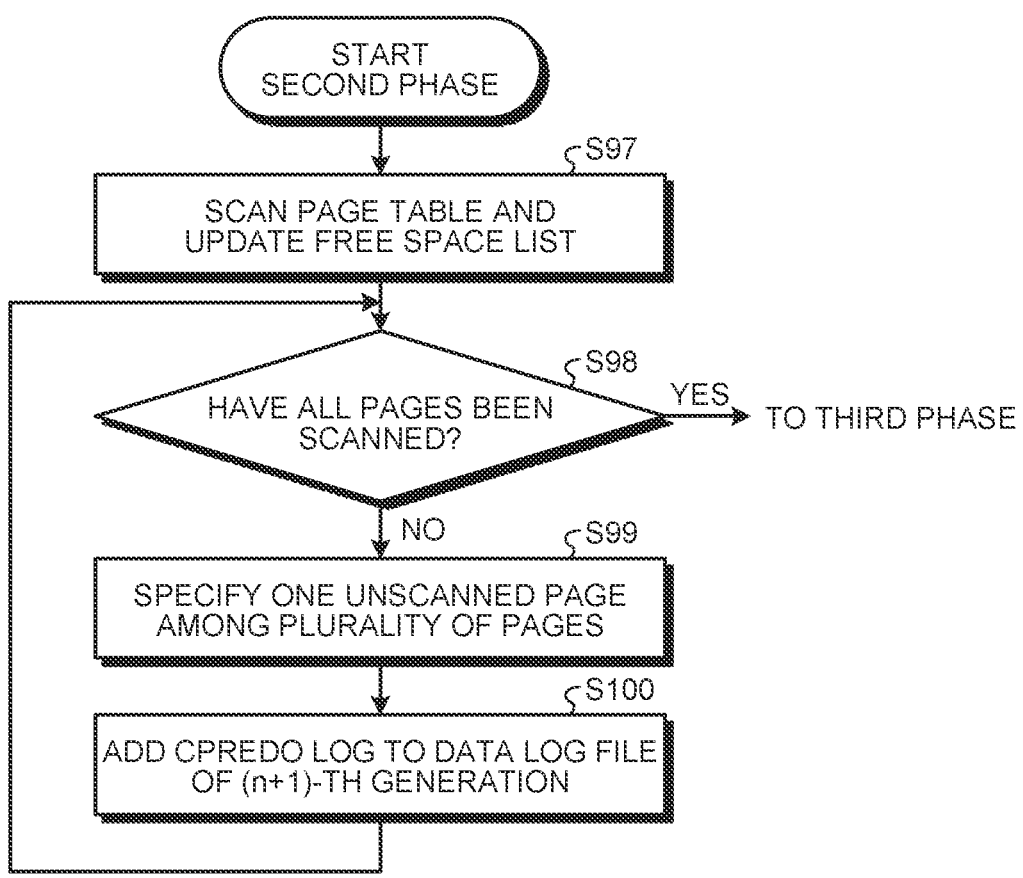
FIG. 14 is a flowchart illustrating a flow of processing of a second phase.

FIG. 14 is a flowchart illustrating a flow of the processing of the second phase. The recovery processing unit 54 starts the processing of the second phase from S97.

First, in S97, the recovery processing unit 54 scans the page table of the first time point and acquires the physical address that is not written in the page table. Then, the recovery processing unit 54 updates the free space list by writing the acquired physical address to the free space list. As a result, the recovery processing unit 54 can recover the free space list at the first time point.

Subsequently, in S98, the recovery processing unit 54 determines whether or not all of the plurality of pages have been scanned by referring to the page table. In a case where all of the plurality of unscanned pages have been scanned (Yes in S98), the recovery processing unit 54 advances the processing to the third phase. In a case where not all the pages have been scanned (No in S98), the recovery processing unit 54 advances the processing to S99.

In S99, the recovery processing unit 54 specifies one unscanned page among the plurality of pages by referring to the page table. In this case, the recovery processing unit 54 does not specify an unused page.

Subsequently, in S100, the recovery processing unit 54 adds, to the data log file of the latest generation (a data log file of an (n+1)-th generation), the CPREDO log indicating a correspondence between the logical address (p) of the specified page and the physical address (r) of the specified page. Then, when the processing of S100 is completed, the recovery processing unit 54 returns the processing to S98 and repeats the processing from S98.

As a result, the recovery processing unit 54 can recover the data log file of the generation at the first time point. In the present embodiment, the recovery processing unit 54 can recover the data log file of the k-th generation.

Figure 15:
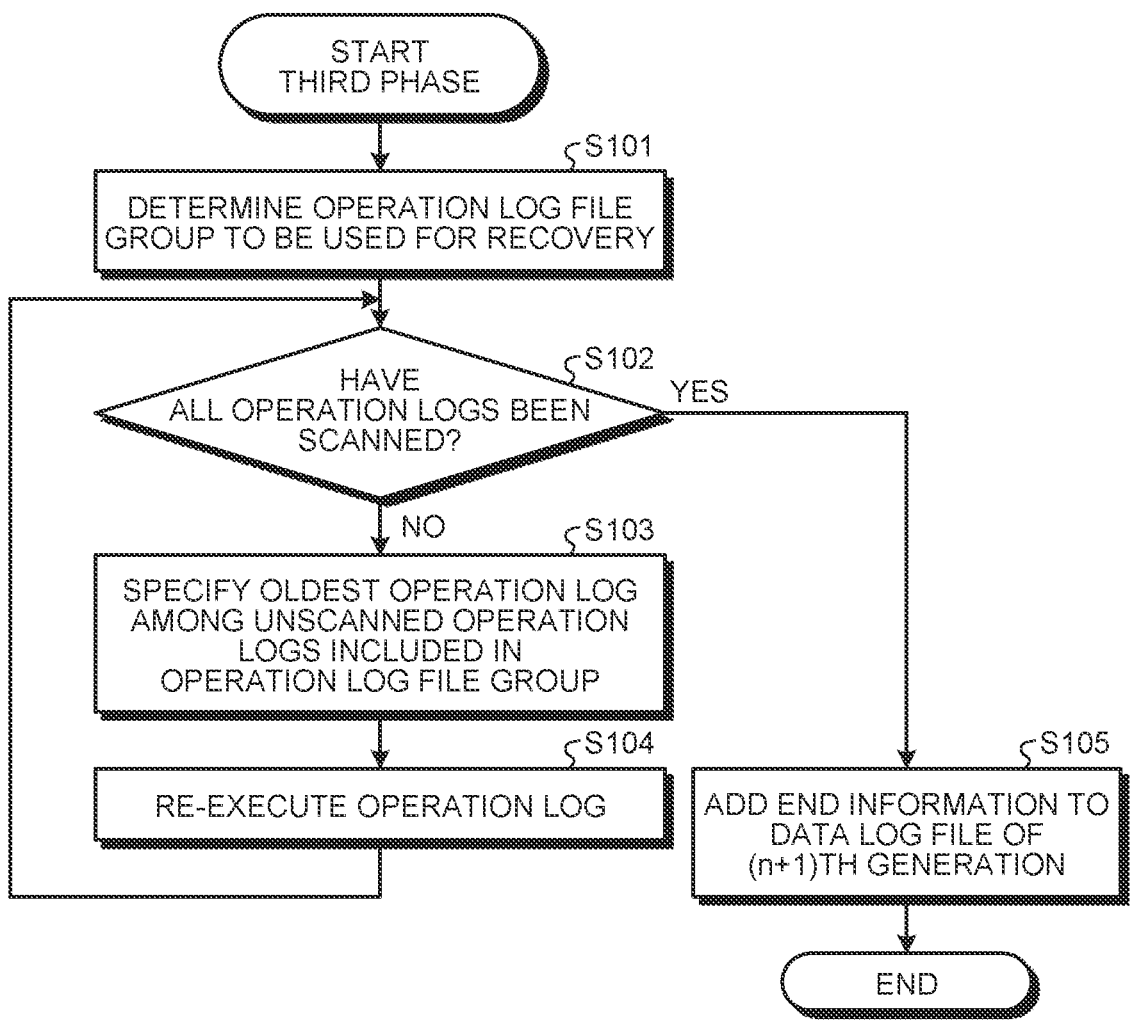
FIG. 15 is a flowchart illustrating a flow of processing of a third phase.

FIG. 15 is a flowchart illustrating a flow of the processing of the third phase. The recovery processing unit 54 starts the processing of the third phase from S101.

First, in S101, the recovery processing unit 54 determines an operation log file group to be used for recovery. The operation log file group to be used for recovery includes the operation log files of one or more generations from the generation at the first time point to the current generation (n). In the present embodiment, the recovery processing unit 54 determines, as the operation log file group to be used for recovery, the operation log files of the k-th to n-th generations.

Subsequently, in S102, the recovery processing unit 54 determines whether or not all the operation logs in the operation log file group have been scanned. In a case where all the operation logs included in the operation log file group have been scanned (Yes in S102), the recovery processing unit 54 advances the processing to S105. In a case where not all the operation logs have been scanned (No in S102), the recovery processing unit 54 advances the processing to S103.

In S103, the recovery processing unit 54 specifies one oldest operation log among unscanned operation logs included in the operation log file group. Subsequently, in S104, the recovery processing unit 54 re-executes the specified operation log. That is, the recovery processing unit 54 executes the page operation and changes the entry of the page table according to the operation log. When the processing of S104 is completed, the recovery processing unit 54 returns the processing to S120.

Then, in S105, the recovery processing unit 54 adds the end information (EOL) to the data log file of the latest generation (n+1) (i.e., (n+1)th generation). As a result, the recovery processing unit 54 can normally complete the addition of the data log to the data log file of the latest generation (n+1).

As described above, even when a failure occurs in the data group, the recovery processing unit 54 recovers the page table of the first time point before the occurrence of the failure by using the data log files of one or more generations before the occurrence of the failure in the data group. Subsequently, the recovery processing unit 54 recovers the data log file of the generation at the first time point based on the recovered page table of the first time point. Then, the recovery processing unit 54 recovers the page table of the latest time point and the data log file of the generation at the latest time point by using the data log file of the generation at the first time point and the operation log files of one or more generations after the generation at the first time point.

As described above, the management device 30 can maintain the logical consistency of the database even when a failure occurs in the data group. Therefore, the management device 30 can increase the tolerance to the failure of the data group and reliability of the data group.

(Example of Scenario of Change of Database System 10)

Next, an example of a scenario of a change in state of the database system 10 will be described with reference to FIGS. 16 to 21. In this scenario, N is set to 3. Then, in a case where p % N=n % N, the page processing unit 38 executes the flash processing on a page whose logical address is p, and adds the CPREDO log to the data log file of the n-th generation.

Figure 16:
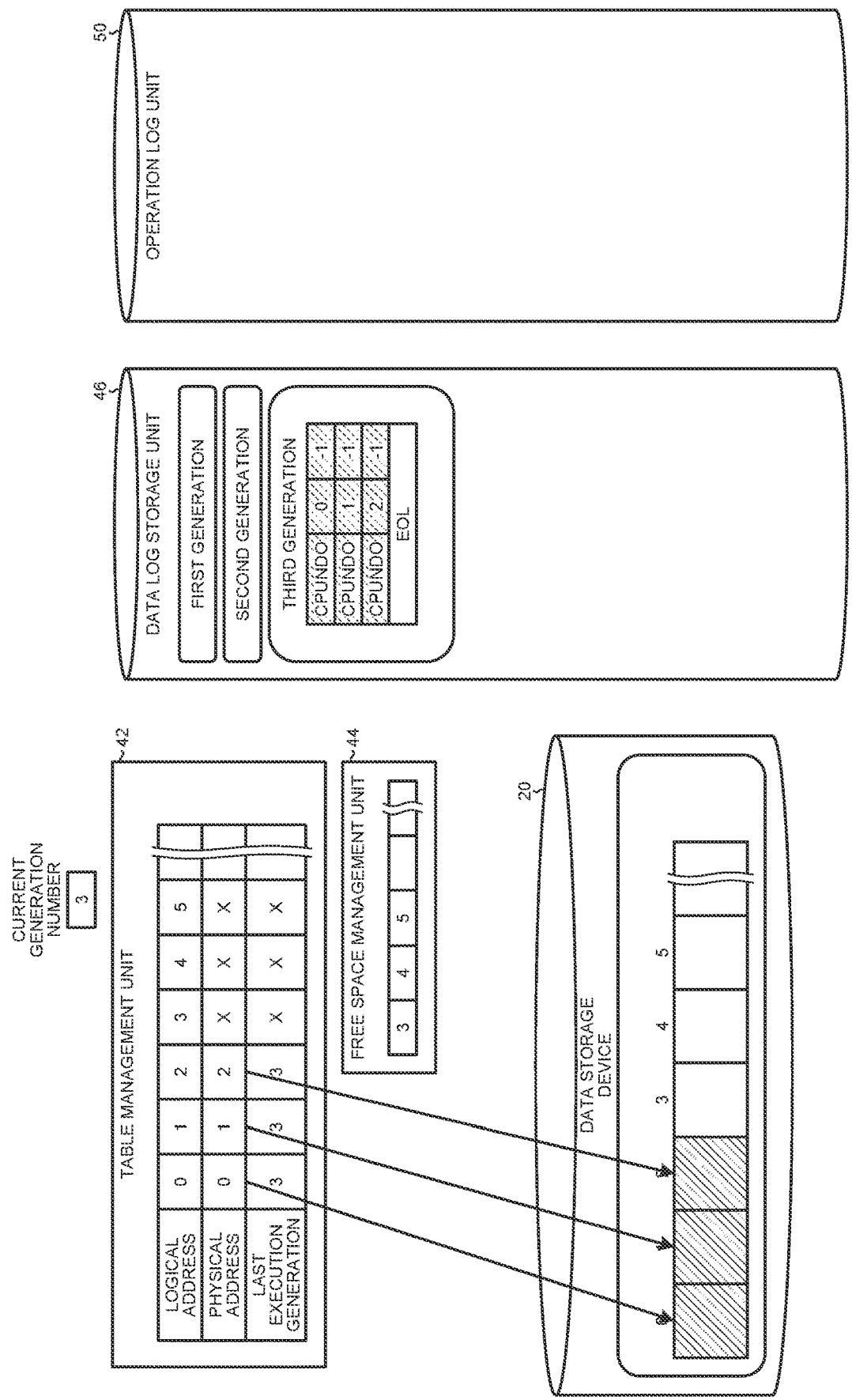
FIG. 16 is a diagram illustrating an example of a third-generation state.

FIG. 16 is a diagram illustrating an example of the state of the database system 10 in a case where the data group is a third generation. It is assumed that the database system 10 is in the state illustrated in FIG. 16 in the third generation.

In the third generation, data of a page whose logical address is 0 is recorded at a position whose physical address is 0, and the last update generation is 3. Data of a page whose logical address is 1 is recorded at a position whose physical address is 1, and the last update generation is 3. Data of a page whose logical address is 2 is recorded at a position whose physical address is 2, and the last update generation is 3.

In addition, the free space list includes physical addresses of 3, 4, and 5. Pages whose logical addresses are 3, 4, and 5 are unused pages.

The data log file of the third generation includes three pieces of CPUNDO log data. In the first CPREDO log, the logical address is 0 and the physical address is −1. In the second CPREDO log, the logical address is 2 and the physical address is −1. In the third CPREDO log, the logical address is 3 and the physical address is −1.

Figure 17:
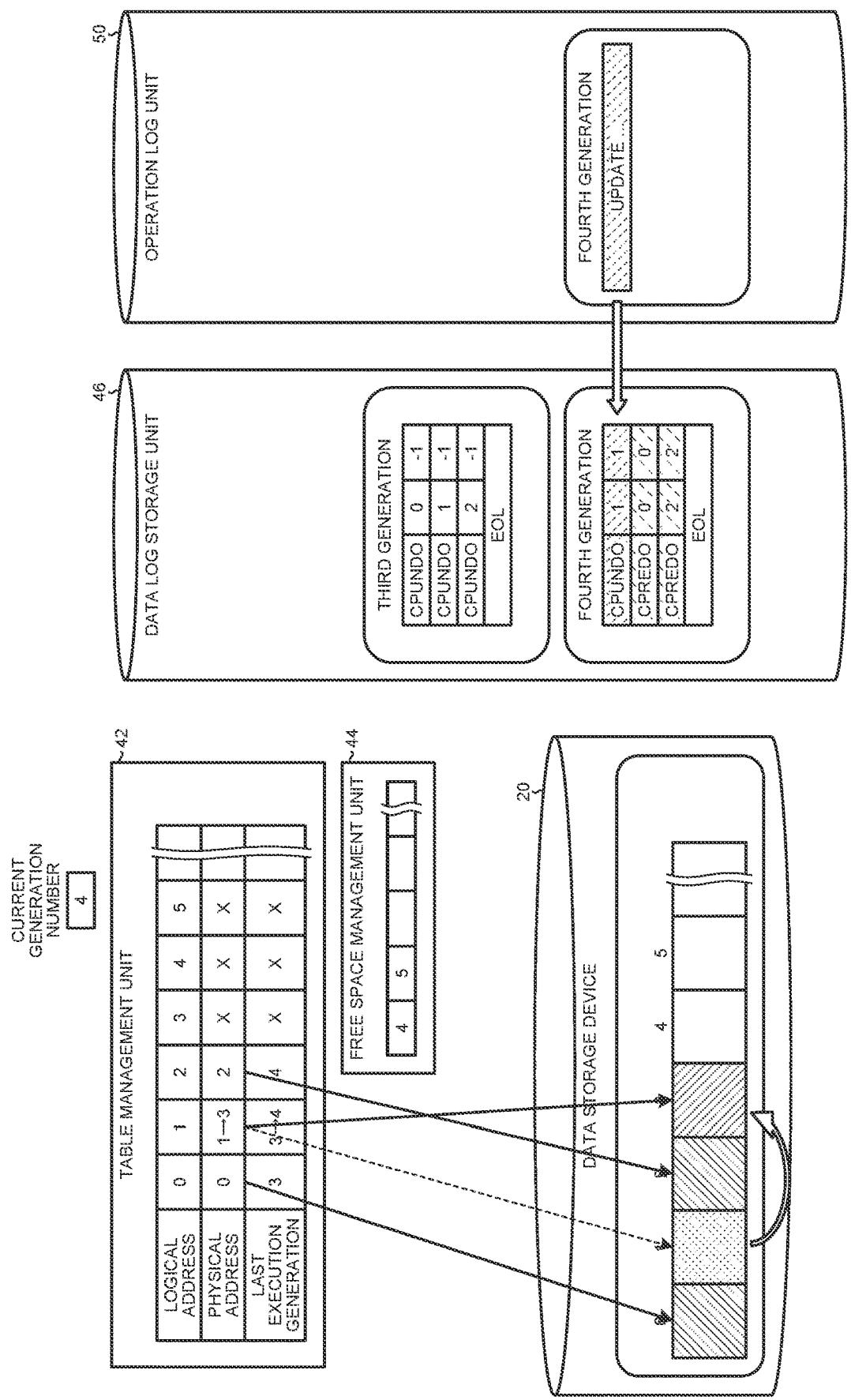
FIG. 17 is a diagram illustrating an example of a fourth-generation state.

FIG. 17 is a diagram illustrating an example of the state of the database system 10 in a case where the data group is a fourth generation. It is assumed that the database system 10 is in the state illustrated in FIG. 17 in the fourth generation subsequent to the third generation.

In the fourth generation, the page processing unit 38 executes the update processing once on the page whose logical address is 1.

In the update processing for the page whose logical address is 1, the page processing unit 38 acquires 3 of the free space list as the physical address of the free space, and copies data whose physical address is 1 to the physical address of 3, thereby changing the data. Further, in the update processing for the page whose logical address is 1, the page processing unit 38 adds the CPUNDO log in which the logical address is 1 and the physical address is 1 to the data log file of the fourth generation. Then, in the update processing for the page whose logical address is 1, the page processing unit 38 changes the physical address of an entry whose logical address is 1 in the page table to 3, and changes the last execution generation to 4.

The operation log management unit 52 adds one operation log to the operation log file of the fourth generation.

In the fourth generation, the last execution generations of the page whose logical address is 0 and the page whose logical address is 2 are the immediately previous generation (third generation). Therefore, the data log management unit 48 adds the CPREDO log to the page whose logical address is 0 and the page whose logical address is 2.

In the fourth generation, the data log management unit 48 does not add the physical address to the free space list.

Figure 18:
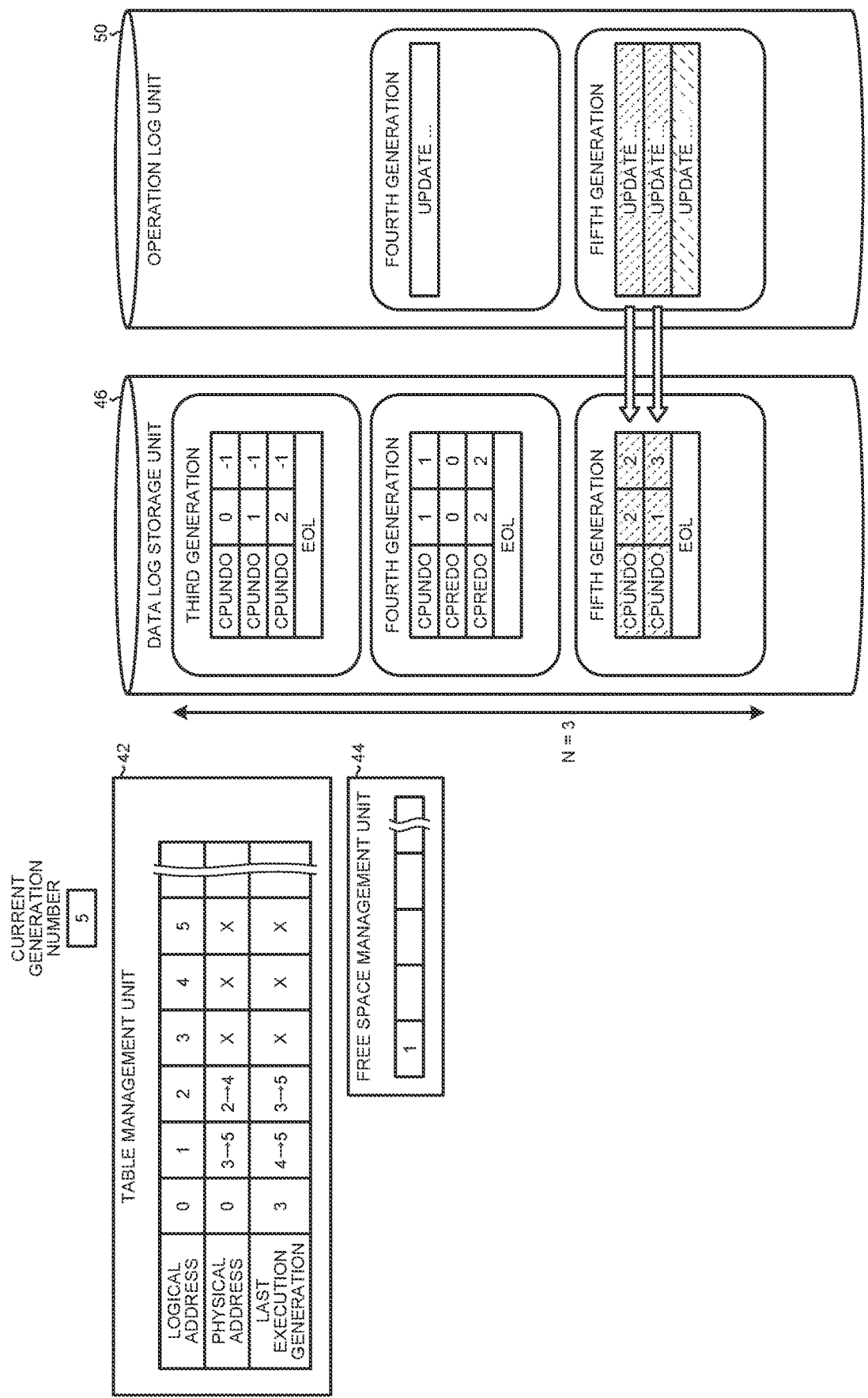
FIG. 18 is a diagram illustrating an example of a fifth-generation state.

FIG. 18 is a diagram illustrating an example of the state of the database system 10 in a case where the data group is a fifth generation. It is assumed that the database system 10 is in the state illustrated in FIG. 18 in the fifth generation subsequent to the fourth generation.

In the fifth generation, the page processing unit 38 executes the update processing once on the page whose logical address is 2. Furthermore, in the fifth generation, the page processing unit 38 executes the update processing twice on the page whose logical address is 1.

In the update processing for the page whose logical address is 2, the page processing unit 38 acquires 4 of the free space list as the physical address of the free space, and copies data whose physical address is 2 to the physical address of 4, thereby changing the data. Further, in the update processing for the page whose logical address is 2, the page processing unit 38 adds the CPUNDO log in which the logical address is 2 and the physical address is 2 to the data log file of the fifth generation. Then, in the update processing for the page whose logical address is 2, the page processing unit 38 changes the physical address of an entry whose logical address is 2 in the page table to 4, and changes the last execution generation to 5.

In the first update processing for the page whose logical address is 1, the page processing unit 38 acquires 5 of the free space list as the physical address of the free space, and copies data whose physical address is 3 to the physical address of 5, thereby changing the data. Further, in the first update processing for the page whose logical address is 1, the page processing unit 38 adds the CPUNDO log in which the logical address is 1 and the physical address is 3 to the data log file of the fifth generation. Then, in the first update processing for the page whose logical address is 1, the page processing unit 38 changes the physical address of an entry whose logical address is 1 in the page table to 5, and changes the last execution generation to 5.

In the second update processing for the page whose logical address is 1, the page processing unit 38 changes the data at a position whose physical address is 5. Then, in the second update processing for the page whose logical address is 1, the page processing unit 38 does not add the CPUNDO log and does not change the page table.

The operation log management unit 52 adds three operation logs to the operation log file of the fifth generation.

In the fifth generation, the data log management unit 48 does not add the CPREDO log to the data log file of the fifth generation since there is no page whose last execution generation is the immediately previous generation (fourth generation) and there is no page satisfying the condition of p % N=n % N.

The data log file of the immediately previous generation (fourth generation) includes the CPUNDO log in which the physical address is 1. Therefore, the data log management unit 48 adds 1 to the free space list.

Figure 19:
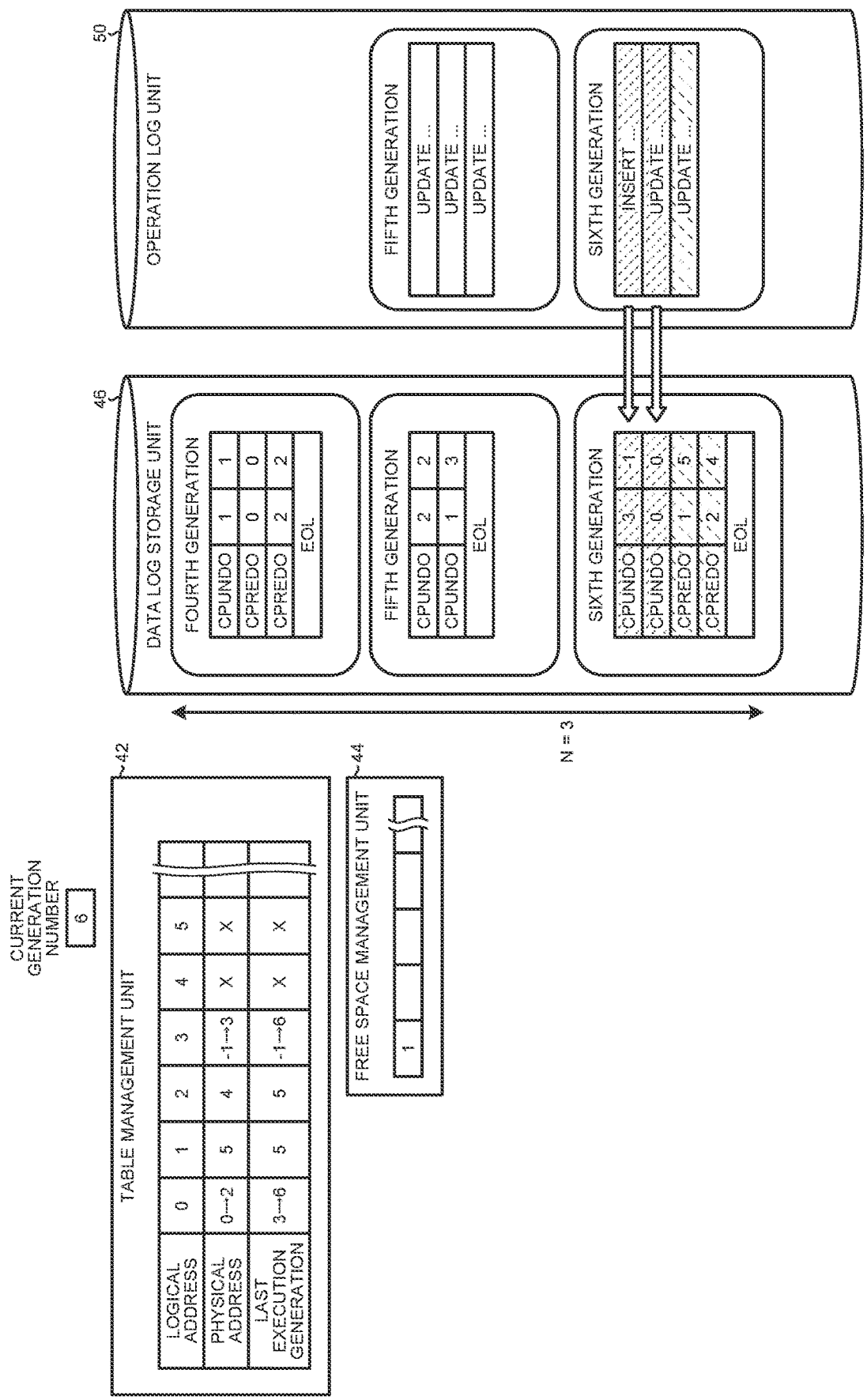
FIG. 19 is a diagram illustrating an example of a sixth-generation state.

FIG. 19 is a diagram illustrating an example of the state of the database system 10 in a case where the data group is a sixth generation. It is assumed that the database system 10 is in the state illustrated in FIG. 19 in the sixth generation subsequent to the fifth generation.

In the sixth generation, the page processing unit 38 executes the insertion processing on a page whose logical address is 3. Furthermore, in the sixth generation, the page processing unit 38 executes the update processing twice on the page whose logical address is 0.

In the insertion processing, the page processing unit 38 acquires 3 of the free space list as the physical address of the free space. Further, in the insertion processing, the page processing unit 38 adds the CPUNDO log in which the logical address is 3 and the physical address is −1 to the data log file of the sixth generation. Then, in the insertion processing, the page processing unit 38 changes the physical address of an entry whose logical address is 3 in the page table to 3, and changes the last execution generation to 6.

In the first update processing for the page whose logical address is 0, the page processing unit 38 acquires 2 of the free space list as the physical address of the free space, and copies data whose physical address is 0 to the physical address of 2, thereby changing the data. Further, in the first update processing for the page whose logical address is 0, the page processing unit 38 adds the CPUNDO log in which the logical address is 0 and the physical address is 0 to the data log file of the sixth generation. Then, in the first update processing for the page whose logical address is 0, the page processing unit 38 changes the physical address of an entry whose logical address is 0 in the page table to 2, and changes the last execution generation to 6.

In the second update processing for the page whose logical address is 0, the page processing unit 38 changes the data at a position whose physical address is 2. Then, in the second update processing for the page whose logical address is 0, the page processing unit 38 does not add the CPUNDO log and does not change the page table.

The operation log management unit 52 adds three operation logs to the operation log file of the sixth generation.

In the sixth generation, the last execution generations of the page whose logical address is 1 and the page whose logical address is 2 are the immediately previous generation (fifth generation). Therefore, the data log management unit 48 adds the CPREDO log to the page whose logical address is 1 and the page whose logical address is 2.

The data log file of the immediately previous generation (fifth generation) includes the CPUNDO log in which the physical address is 2 and the CPUNDO log in which the physical address is 3. Therefore, the data log management unit 48 adds 2 and 3 to the free space list. However, the physical addresses of 2 and 3 added to the free space list are immediately extracted in the insertion processing and the update processing in the sixth generation.

Figure 20:
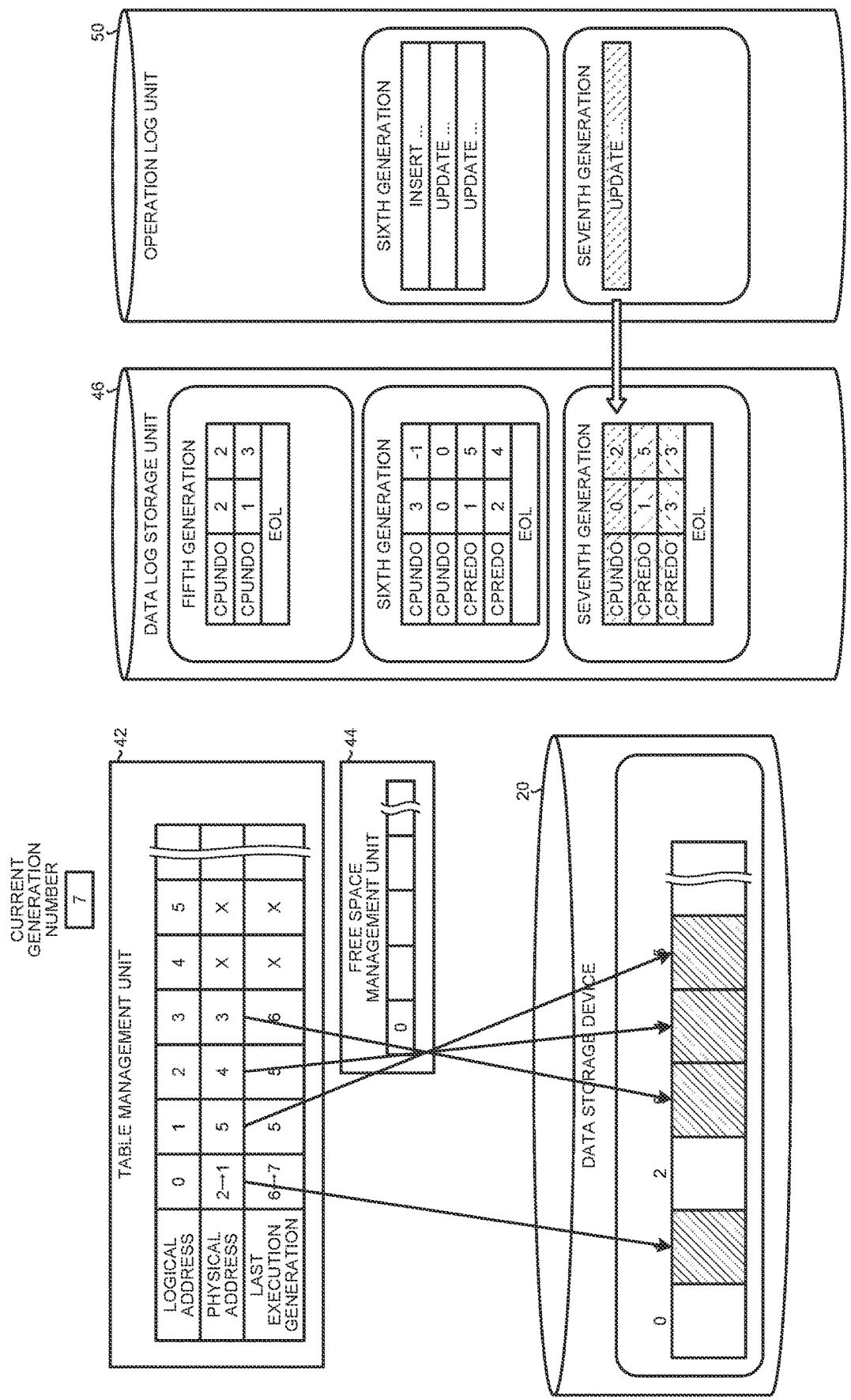
FIG. 20 is a diagram illustrating an example of a seventh-generation state.

FIG. 20 is a diagram illustrating an example of the state of the database system 10 in a case where the data group is a seventh generation. It is assumed that the database system 10 is in the state illustrated in FIG. 20 in the seventh generation subsequent to the sixth generation.

In the seventh generation, the page processing unit 38 executes the update processing once on the page whose logical address is 0.

In the update processing, the page processing unit 38 acquires 1 of the free space list as the physical address of the free space, and copies data whose physical address is 2 to the physical address of 1, thereby changing the data. Further, in the update processing, the page processing unit 38 adds the CPUNDO log in which the logical address is 0 and the physical address is 2 to the data log file of the seventh generation. Then, in the update processing, the page processing unit 38 changes the physical address of an entry whose logical address is 0 in the page table to 1, and changes the last execution generation to 7.

The operation log management unit 52 adds one operation log to the operation log file of the seventh generation.

In the seventh generation, the last execution generation of the page whose logical address is 1 is earlier than the immediately previous generation (sixth generation), and p % N=n % N. Therefore, the data log management unit 48 adds the CPREDO log for the page whose logical address is 1. Furthermore, in the seventh generation, the last execution generation of the page whose logical address is 3 is the immediately previous generation (sixth generation). Therefore, the data log management unit 48 adds the CPREDO log for the page whose logical address is 3.

The data log file of the immediately previous generation (sixth generation) includes two CPUNDO logs in which the physical addresses are −1 and 0. The physical address of −1 indicates that no data is recorded. Therefore, the data log management unit 48 adds only 0 to the free space list.

Figure 21:
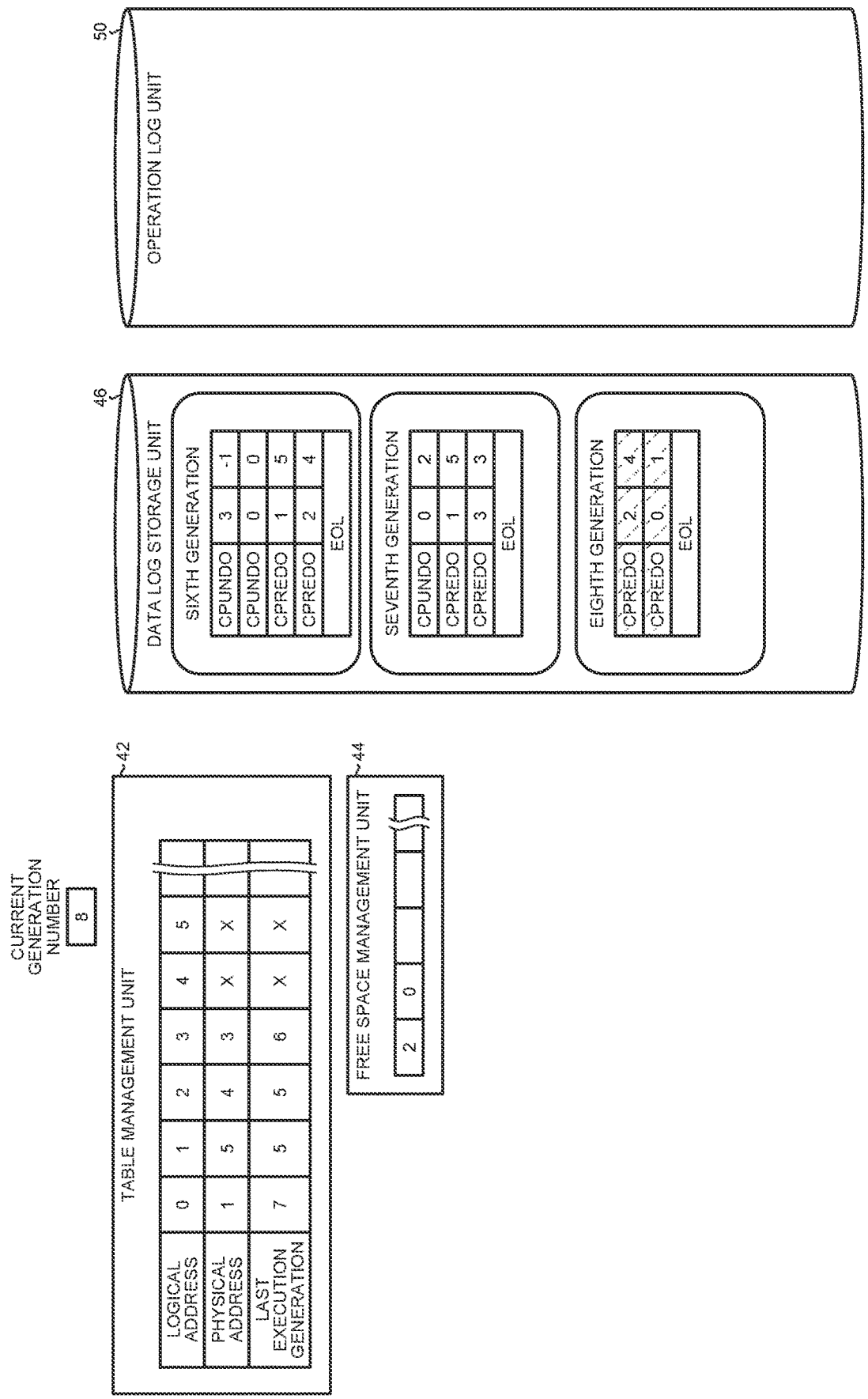
FIG. 21 is a diagram illustrating an example of an eighth-generation state.

FIG. 21 is a diagram illustrating an example of the state of the database system 10 in a case where the data group is an eighth generation. It is assumed that the database system 10 is in the state illustrated in FIG. 21 in the eighth generation subsequent to the seventh generation.

In the eighth generation, the page processing unit 38 does not execute the page operation. Therefore, the operation log management unit 52 does not add the operation log to the operation log file of the eighth generation.

In the eighth generation, the last execution generation of the page whose logical address is 2 is earlier than the immediately previous generation (seventh generation), and p % N=n % N. Therefore, the data log management unit 48 adds the CPREDO log for the page whose logical address is 2. Furthermore, in the eighth generation, the last execution generation of the page whose logical address is 0 is the immediately previous generation (seventh generation). Therefore, the data log management unit 48 adds the CPREDO log for the page whose logical address is 0.

The data log file of the immediately previous generation (seventh generation) includes the CPUNDO log in which the physical address is 2. Therefore, the data log management unit 48 adds 2 to the free space list.

In a case of the shadow page method according to the related art, the data log file usually includes records corresponding to the size of the page table for each generation. However, the data log file according to the present embodiment only needs to include a log having a size corresponding to the page table at the maximum except for the end information (EOL), and often includes a log smaller than the size of the page table. The management device 30 can increase the effect of reducing the size of the data log file in a case of managing a database having a larger size. For example, a ratio between the size of the data log file according to the present embodiment and the size of the data log file of the shadow page according to the related art is expressed by the following Formula (1).

$$\text{Size according to present embodiment: size in shadow page method according to related art} = L/N + \text{update amount}:L \quad (1)$$

L represents the number of pages. Usually, the update amount<<L. Therefore, Formula (1) is approximated as Formula (2).

$$\text{Size according to present embodiment: size in shadow page method according to related art} = 1:N \quad (2)$$

(Recovery Processing when Failure Occurs)

Next, recovery processing in the database system 10 when a failure occurs will be described with reference to FIGS. 22 and 23. Hereinafter, a case where a failure occurs in the middle of the seventh generation in the scenarios of FIGS. 16 to 22 will be described as an example.

Figure 22:
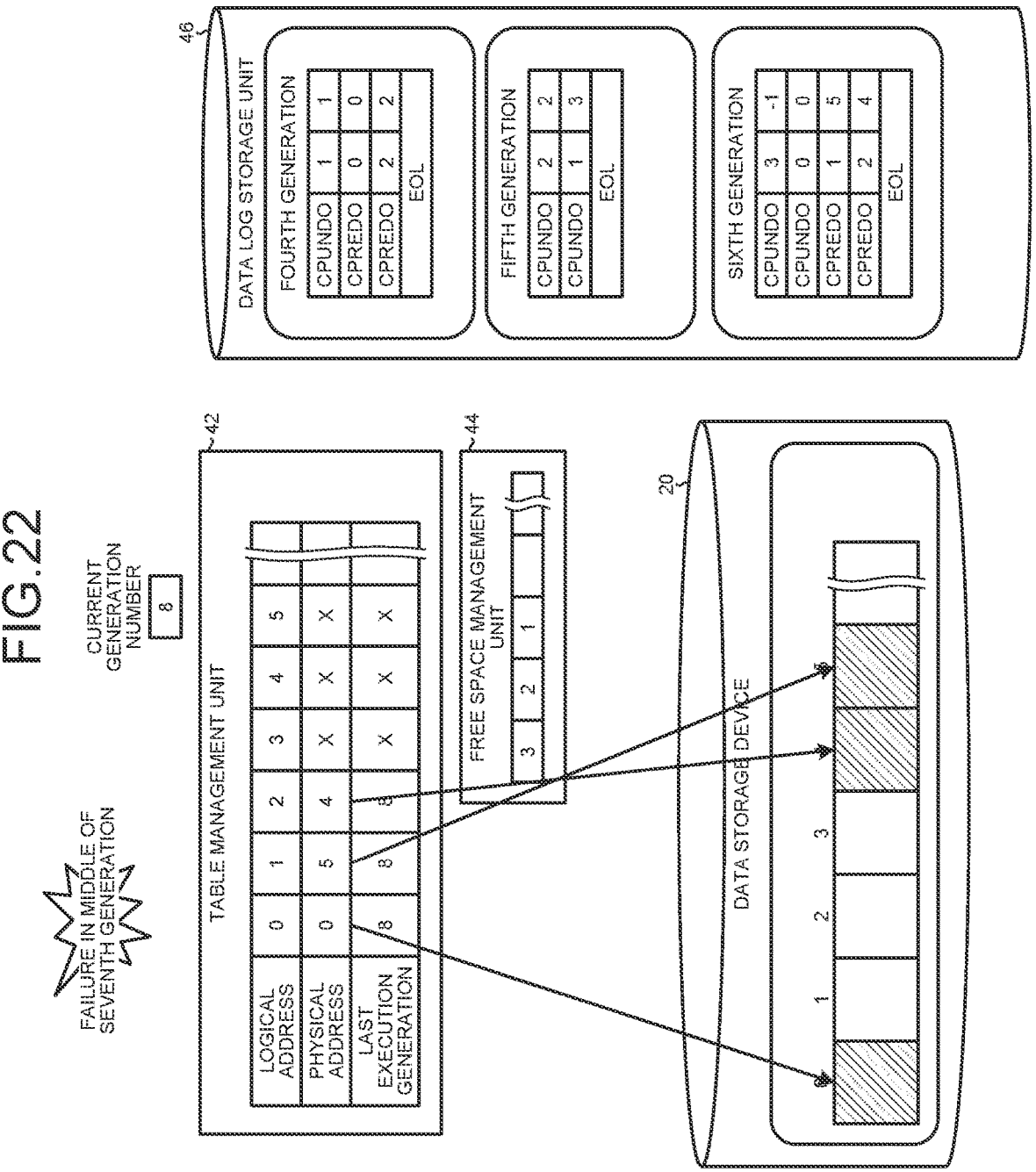
FIG. 22 is a diagram illustrating an example of a state in the middle of the recovery processing in a case where a failure occurs.

FIG. 22 is a diagram illustrating an example of a state in the middle of the recovery processing in a case where a failure occurs.

First, the recovery processing unit 54 executes the processing of the first phase and the second phase. In the first phase, the recovery processing unit 54 determines the data log file group.

Since the failure occurs in the middle of the seventh generation, the data log file of the seventh generation does not include the end information (EOL). Therefore, the data log file of the sixth generation is the last generation including the end information (EOL). Therefore, the recovery processing unit 54 selects, as the data log file group, the data log files of the latest N generations (latest three generations) including the sixth generation. That is, the recovery processing unit 54 selects, as the data log file group, the data log files of the fourth generation, the fifth generation, and the sixth generation. Further, the recovery processing unit 54 changes the generation number of the current generation to 8 which is the latest generation.

The recovery processing unit 54 executes the first phase and the second phase by using the data log file group including the data log files of the fourth generation, the fifth generation, and the sixth generation. As a result, the recovery processing unit 54 can recover the page table and the free space list as illustrated in FIG. 22.

That is, the recovery processing unit 54 sets the physical address of the entry of the page whose logical address is 0 to 0, sets the physical address of the entry of the page whose logical address is 1 to 5, and sets the physical address of the entry of the page whose logical address is 2 to 4. In addition, the recovery processing unit 54 sets the last execution generations of the entries whose logical addresses are 0, 1, and 2 to 8. Further, the recovery processing unit 54 includes, in the free space list, 3, 2, and 1.

Figure 23:
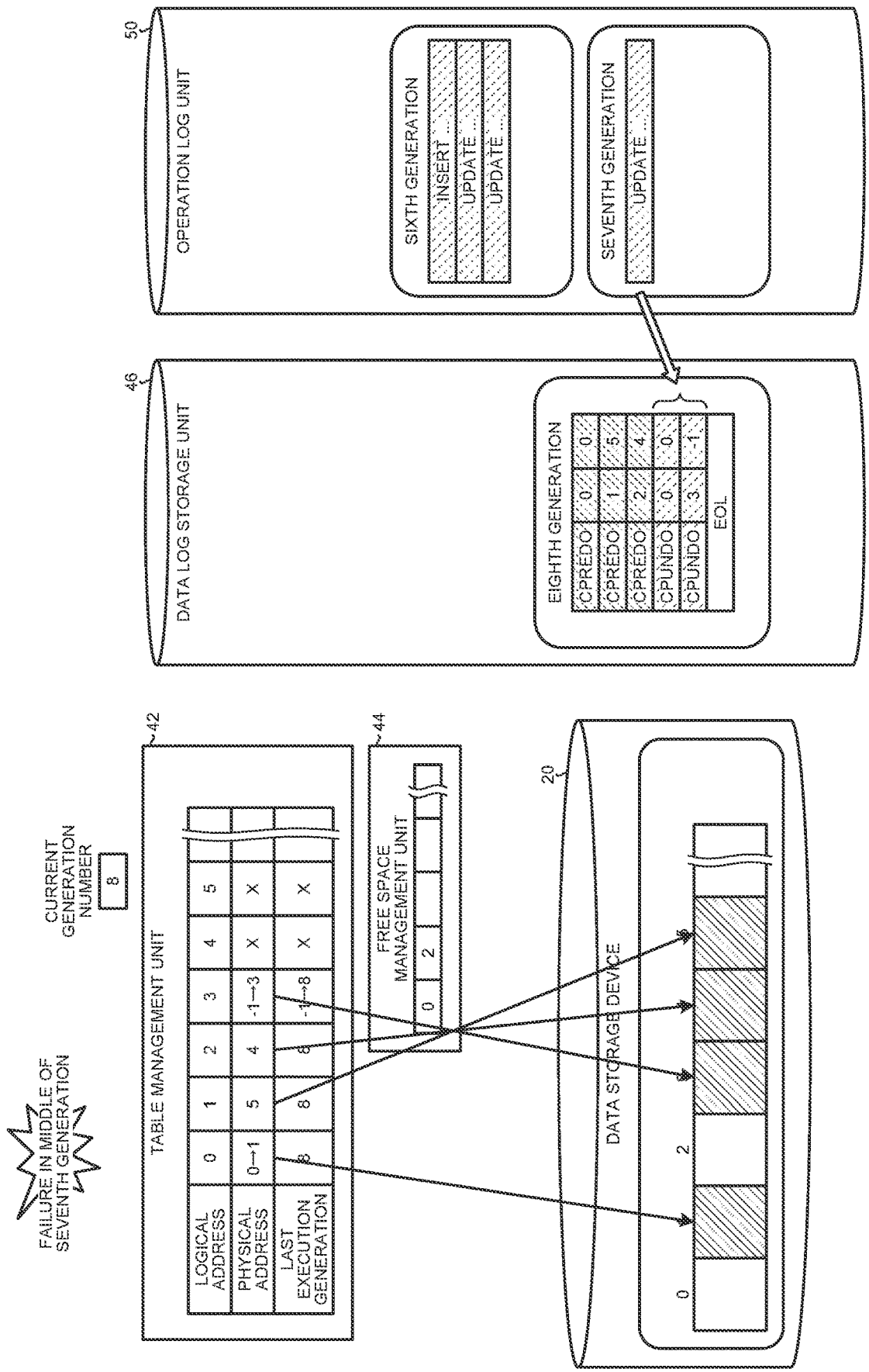
FIG. 23 is a diagram illustrating an example of a state after the recovery processing in a case where a failure occurs.

FIG. 23 is a diagram illustrating an example of a state after the recovery processing in a case where a failure occurs.

The recovery processing unit 54 can add the CPREDO log to the data log file of the eighth generation by completing the second phase. That is, the recovery processing unit 54 can add, to the data log file of the eighth generation, the CPREDO log in which the logical address is 0 and the physical address is 0, the CPREDO log in which the logical address is 1 and the physical address is 5, and the CPREDO log in which the logical address is 2 and the physical address is 4.

Further, the recovery processing unit 54 executes the third phase. In the third phase, the recovery processing unit 54 determines, as the operation log file group, the operation log files of the latest generations in which no failure occurs. In this example, the recovery processing unit 54 determines, as the operation log file group, the operation log file of the sixth generation and the operation log file of the seventh generation.

Then, in the third phase, the recovery processing unit 54 sequentially executes all the operation logs included in the operation log file of the sixth generation and the operation log file of the seventh generation from the oldest operation log. As a result, the recovery processing unit 54 can recover the page table and the free space list at the latest time point, and the data log file of the generation (eighth generation) at the latest time point, as illustrated in FIG. 23.

That is, the recovery processing unit 54 can set the physical address of the entry of the page whose logical address is 0 to 1, set the physical address of the entry of the page whose logical address is 1 to 5, set the physical address of the entry of the page whose logical address is 2 to 4, and set the physical address of the entry of the page whose logical address is 2 to 3. In addition, the recovery processing unit 54 can set the last execution generations of the entries whose logical addresses are 0, 1, 2, and 3 to 8. Furthermore, the recovery processing unit 54 can include, in the free space list, 0 and 2.

Further, the recovery processing unit 54 can add the CPUNDO log to the data log file of the eighth generation by completing the third phase. That is, the recovery processing unit 54 can add, to the data log file of the eighth generation, the CPUNDO log in which the logical address is 0 and the physical address is 0 and the CPUNDO log in which the logical address is 3 and the physical address is −1.

Figure 24:
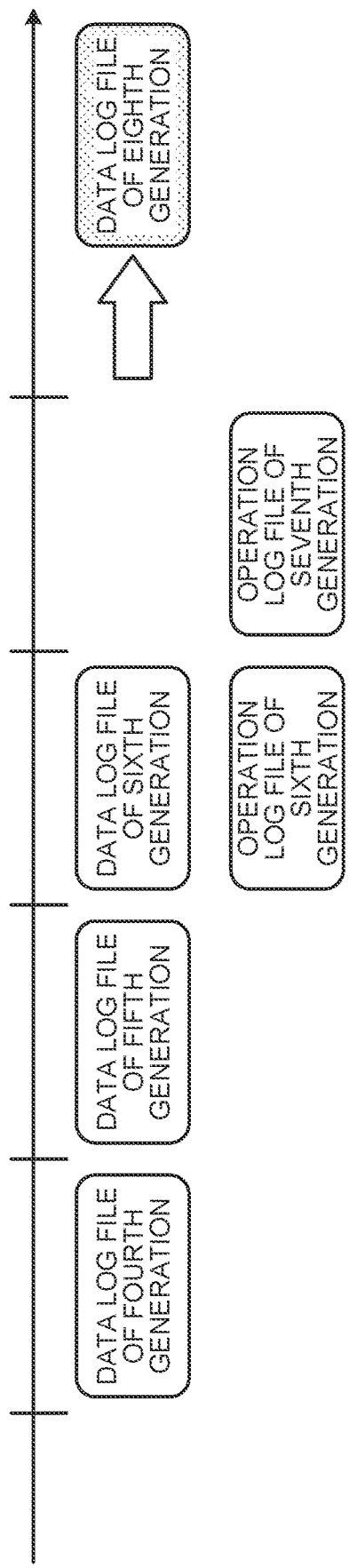
FIG. 24 is a diagram illustrating a file used in the recovery processing.

FIG. 24 is a diagram illustrating a file used in the recovery processing. As described with reference to FIGS. 22 and 23, in a case where a failure occurs in the middle of the seventh generation in the scenario of FIGS. 16 to 22, the recovery processing unit 54 can recover the data log file of the eighth generation by using the data log file of the fourth generation, the data log file of the fifth generation, the data log file of the sixth generation, the operation log file of the sixth generation, and the operation log file of the seventh generation.

As described above, the management device 30 can reliably recover the data group even when a failure occurs in any generation.

(Hardware Configuration)

Figure 25:
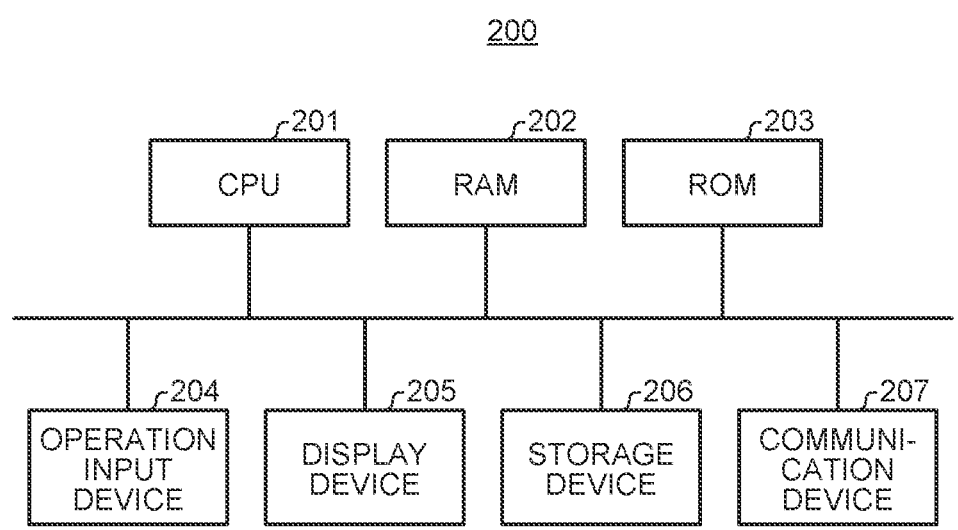
FIG. 25 is a diagram illustrating a hardware configuration of an information processing device according to an embodiment.

FIG. 25 is a diagram illustrating a hardware configuration of an information processing device 200 according to the embodiment. The management device 30 is implemented by the information processing device 200 having the hardware configuration as illustrated in FIG. 25, for example.

The information processing device 200 includes a central processing unit (CPU) 201, a random access memory (RAN) 202, a read only memory (ROM) 203, an operation input device 204, a display device 205, a storage device 206, and a communication device 207. These components are connected by a bus.

The CPU 201 is a processor that executes arithmetic processing, control processing, and the like according to a program. The CPU 201 uses a predetermined area of the RAM 202 as a work area, and executes various types of processing in cooperation with a program stored in the ROM 203, the storage device 206, or the like.

The RAM 202 is a memory such as a synchronous dynamic random access memory (SDRAM). The RAM 202 functions as a work area of the CPU 201. The ROM 203 is a memory that stores programs and various types of information in a non-rewritable manner.

The operation input device 204 is an input device such as a mouse or a keyboard. The operation input device 204 receives information input from a user as an instruction signal, and outputs the instruction signal to the CPU 201.

The display device 205 is a display device such as a liquid crystal display (LCD). The display device 205 displays various types of information based on a display signal from the CPU 201.

The storage device 206 is a device that writes and reads data to and from a semiconductor storage medium such as a flash memory, a magnetically or optically recordable storage medium, or the like. The storage device 206 writes and reads data to and from the storage medium under the control of the CPU 201. The communication device 207 communicates with an external device via a network under the control of the CPU 201.

The program executed by the management device 30 has a module configuration including a generation management module, a communication processing module, a data processing module, a page processing module, a buffer management module, a table management module, a free space management module, a data log management module, an operation log management module, and a recovery processing module. The program is loaded to the RAM 202 and executed by the CPU 201 (processor), thereby causing the information processing device 200 to function as the generation management unit 32, the communication processing unit 34, the data processing unit 36, the page processing unit 38, the buffer management unit 40, the table management unit 42, the free space management unit 44, the data log management unit 48, the operation log management unit 52, and the recovery processing unit 54. The management device 30 is not limited to such a configuration, and may have a configuration in which at least some of the generation management unit 32, the communication processing unit 34, the data processing unit 36, the page processing unit 38, the buffer management unit 40, the table management unit 42, the free space management unit 44, the data log management unit 48, the operation log management unit 52, and the recovery processing unit 54 are implemented by a hardware circuit (for example, a semiconductor integrated circuit).

In addition, the program executed by the management device 30 is provided by being recorded in a computer-readable recording medium such as a CD-ROM, a flexible disk, a CD-R, and a digital versatile disk (DVD) as a file in a format installable in a computer or an executable format.

In addition, the program executed by the management device 30 may be stored in a computer connected to a network such as the Internet and provided by being downloaded via the network. In addition, the program executed by the management device 30 may be provided or distributed via a network such as the Internet. In addition, the program executed by the management device 30 may be provided by being incorporated in a ROM or the like in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A management device that manages a data group stored in a data storage device by dividing the data group into a plurality of pages, the management device comprising:

one or more hardware processors configured to function as:
  a generation management unit that increases a generation of the data group as time elapses;
  a page processing unit that executes a page operation that is page-unitary change processing, for the data group;
  a table management unit that manages a page table that associates, for each of the plurality of pages, a logical address, a physical address indicating a space secured for a corresponding page in the data storage device, and a last execution generation indicating the generation of executing the page operation last for the corresponding page;
  a data log management unit that manages a data log file including a data log indicating a correspondence between the logical address and the physical address for each generation; and
  an operation log management unit that manages an operation log file including an operation log indicating a content and an execution order of the page operation executed in a corresponding generation for each generation, wherein
  when the page operation is executed for any one of the plurality of pages, the table management unit updates an entry related to the page subjected to the page operation in the page table,
the page processing unit
  secures, when update processing, as one of page operations, is executed first in a current generation for any update target page among the plurality of pages, a free space in the data storage device to store data of the update target page, and updates the update target page on the secured free space, and
  adds, to the data log file of the current generation, a CPUNDO log that is the data log indicating a correspondence between the logical address and the physical address indicating a position of data at start of the current generation in the update target page, and
the data log management unit
  writes the data at the start of the current generation to a position indicated by the physical address of the page table in the data storage device for an immediately previous operation page subjected to the page operation in an immediately previous generation among the plurality of pages, and
  adds, to the data log file of the current generation, a CPREDO log that is the data log indicating a correspondence between the logical address and the physical address with the data at the start of the current generation being written in the immediately previous operation page.

2. The management device according to claim 1, wherein the one or more hardware processors are configured to further function as:
a recovery processing unit, wherein
the recovery processing unit
  recovers, when a failure occurs in the data group, the page table at a first time point before the occurrence of the failure by using data log files of one or more generations before the failure occurs in the data group, and
  recovers the data group by using the page table at the first time point and the operation log files of one or more generations of or after the generation at the first time point.

3. The management device according to claim 1, wherein the page processing unit
secures, when insertion processing of inserting a new page into the plurality of pages is executed, a free space in the data storage device to store data of the new page, the insertion processing being one of the page operations; and
adds, to the data log file of the current generation, the CPUNDO log indicating a correspondence between the logical address and the physical address indicating that there is no data in the new page.

4. The management device according to claim 3, wherein when deletion processing of deleting any deletion target page among the plurality of pages is executed, the page processing unit adds, to the data log file of the current generation, the CPUNDO log indicating a correspondence between the logical address and the physical address in the deletion target page, the deletion processing being one of the page operations.

5. The management device according to claim 4, wherein when the page operation is executed for any one of the plurality of pages, the table management unit adds the CPUNDO log to the data log file of the current generation, and then updates the entry related to the page subjected to the page operation in the page table.

6. The management device according to claim 5, wherein the one or more hardware processors are configured to further function as:
a free space management unit that manages a free space list that is a list of physical addresses of free spaces in the data storage device, and
the page processing unit acquires the physical address from the free space list, secures a free space, and deletes the acquired physical address from the free space list.

7. The management device according to claim 6, wherein the data log management unit
writes the data at the start of the current generation to the position indicated by the physical address of the page table in the data storage device for a non-updated page that is not subjected to the update processing or the insertion processing in latest N generations including the current generation among the plurality of pages, N being an integer of 1 or more, and
adds, to the data log file of the current generation, the CPREDO log indicating a correspondence between the logical address and the physical address with the data at the start of the current generation being written in the non-updated page.

8. The management device according to claim 7, wherein the data log management unit adds the physical address indicated in the CPUNDO log included in the data log file of the immediately previous generation to the free space list.

9. The management device according to claim 8, wherein the data log management unit adds the CPREDO log to the data log file of the current generation for all immediately previous operation pages and all non-updated pages included in the plurality of pages, and then adds end information that is the data log indicating that the addition of the data log is normally completed, to the data log file of the immediately previous generation.

10. The management device according to claim 9, wherein the data log management unit adds the end information to the data log file of the immediately previous generation, and then deletes the data log file of a generation before the latest N generations.

11. The management device according to claim 1, wherein the one or more hardware processors are configured to further function as:
a buffer management unit that stores a part of or an entire of the data group stored in the data storage device in a buffer memory, wherein
the page processing unit executes the page operation for data stored in the buffer memory.

12. The management device according to claim 1, wherein the one or more hardware processors are configured to further function as:
a data log storage unit that is a non-volatile storage device storing therein the data log file; and
an operation log storage unit that is a non-volatile storage device storing therein the operation log file.

13. A management method implemented by an information processing device and managing a data group stored in a data storage device by dividing the data group into a plurality of pages, the management method comprising:
a generation management step of increasing a generation of the data group as time elapses;
a page processing step of executing a page operation that is page-unitary change processing, for the data group;
a table management step of managing a page table that associates, for each of the plurality of pages, a logical address, a physical address indicating a space secured for a corresponding page in the data storage device, and a last execution generation indicating the generation of executing the page operation last for the corresponding page;
a data log management step of managing a data log file including a data log indicating a correspondence between the logical address and the physical address for each generation; and
an operation log management step of managing an operation log file including an operation log indicating a content and an execution order of the page operation executed in a corresponding generation for each generation, wherein
the management method further comprises:
in the table management step, when the page operation is executed for any one of the plurality of pages, by the information processing device, updating an entry related to the page subjected to the page operation in the page table,
in the page processing step, by the information processing device,
securing, when update processing, as one of page operations, is executed first in a current generation for any update target page among the plurality of pages, a free space in the data storage device to store data of the update target page, and updating the update target page on the secured free space, and
adding, to the data log file of the current generation, a CPUNDO log that is the data log indicating a correspondence between the logical address and the physical address indicating a position of data at start of the current generation in the update target page, and
in the data log management step, by the information processing device,
writing the data at the start of the current generation to a position indicated by the physical address of the page table in the data storage device for an immediately previous operation page subjected to the page operation in an immediately previous generation among the plurality of pages, and adding, to the data log file of the current generation, a CPREDO log that is the data log indicating a correspondence between the logical address and the physical address with the data at the start of the current generation being written in the immediately previous operation page.

14. A computer program product having a non-transitory computer readable medium including programmed instructions, wherein the instructions, when executed by a computer of an information processing device configured to function as a management device that manages a data group stored in a data storage device by dividing the data group into a plurality of pages, cause the computer to function as:
a generation management unit that increases a generation of the data group as time elapses;
a page processing unit that executes a page operation that is page-unitary change processing, for the data group;
a table management unit that manages a page table that associates, for each of the plurality of pages, a logical address, a physical address indicating a space secured for a corresponding page in the data storage device, and a last execution generation indicating the generation of executing the page operation last for the corresponding page;
a data log management unit that manages a data log file including a data log indicating a correspondence between the logical address and the physical address for each generation; and
an operation log management unit that manages an operation log file including an operation log indicating a content and an execution order of the page operation executed in a corresponding generation for each generation, wherein when the page operation is executed for any one of the plurality of pages, the table management unit updates an entry related to the page subjected to the page operation in the page table,
the page processing unit
secures, when update processing, as one of page operations, is executed first in a current generation for any update target page among the plurality of pages, a free space in the data storage device to store data of the update target page, and updates the update target page on the secured free space, and
adds a CPUNDO log that is the data log indicating a correspondence between the logical address and the physical address indicating a position of data at start of the current generation in the update target page, to the data log file of the current generation, and
the data log management unit
writes the data at the start of the current generation to a position indicated by the physical address of the page table in the data storage device for an immediately previous operation page subjected to the page operation in an immediately previous generation among the plurality of pages, and
adds a CPREDO log that is the data log indicating a correspondence between the logical address and the physical address with the data at the start of the current generation being written in the immediately previous operation page, to the data log file of the current generation.

* * * * *